United States Patent
Liang et al.

(10) Patent No.: US 12,244,170 B2
(45) Date of Patent: Mar. 4, 2025

(54) VOLTAGE CONVERSION CIRCUIT, CONTROL METHOD, DC/DC CONVERTER, AND DEVICE

(71) Applicant: Huawei Digital Power Technologies Co., Ltd., Guangdong (CN)

(72) Inventors: Tao Liang, Dongguan (CN); Weiping Liu, Dongguan (CN); Ren Liu, Dongguan (CN); Dong Li, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 254 days.

(21) Appl. No.: 18/161,252

(22) Filed: Jan. 30, 2023

(65) Prior Publication Data

US 2023/0179011 A1 Jun. 8, 2023

Related U.S. Application Data

(63) Continuation of application No. PCT/CN2021/108478, filed on Jul. 26, 2021.

(30) Foreign Application Priority Data

Jul. 31, 2020 (CN) .......................... 202010761976.6

(51) Int. Cl.
  *H02J 7/34* (2006.01)
  *H02J 7/00* (2006.01)
  (Continued)

(52) U.S. Cl.
  CPC ............. *H02J 7/345* (2013.01); *H02J 7/0013* (2013.01); *H02M 1/32* (2013.01); *H02M 1/36* (2013.01);
  (Continued)

(58) Field of Classification Search
  CPC ...... H02J 7/345; H02J 7/0013; H02J 2207/20; H02J 2207/50; H02M 1/32; H02M 1/36; B60L 3/04; B60L 2210/10
  See application file for complete search history.

(56) References Cited

U.S. PATENT DOCUMENTS 9,088,221 B2 * 7/2015 Lai ..................... H02M 3/33523
2005/0088868 A1 4/2005 Ryan et al.
(Continued)

FOREIGN PATENT DOCUMENTS

CN 101789600 A 7/2010
CN 103532379 A 1/2014
(Continued)

*Primary Examiner* — Rafael O De Leon Domenech

(57) ABSTRACT

Embodiments of this application provide a voltage conversion circuit, a control method, a DC/DC converter and a device. The voltage conversion circuit includes a failure isolation module, a soft start module, and a voltage conversion module. The voltage conversion module includes an output filter capacitor. Both a first terminal of the failure isolation module and a first terminal of the soft start module are connected to a positive electrode of a first battery, both a second terminal of the failure isolation module and a second terminal of the soft start module are connected to a first terminal of the output filter capacitor, and a second terminal of the output filter capacitor is connected to a negative electrode of the first battery. The soft start module is configured to connect the first battery and the output filter capacitor, so that the first battery charges the output filter capacitor.

15 Claims, 11 Drawing Sheets

(51) Int. Cl.
*H02M 1/32* (2007.01)
*H02M 1/36* (2007.01)
*B60L 3/04* (2006.01)

(52) U.S. Cl.
CPC ............. *B60L 3/04* (2013.01); *B60L 2210/10* (2013.01); *H02J 2207/20* (2020.01); *H02J 2207/50* (2020.01)

(56) References Cited

U.S. PATENT DOCUMENTS

| | | |
|---|---|---|
| 2009/0285001 A1 | 11/2009 | Hu et al. |
| 2016/0200196 A1* | 7/2016 | Michaelides ........... B60L 50/16 701/22 |
| 2019/0326904 A1 | 10/2019 | Takakura et al. |
| 2020/0366079 A1* | 11/2020 | Telefus .............. G01R 19/2513 |

FOREIGN PATENT DOCUMENTS

| | | |
|---|---|---|
| CN | 204497987 U | 7/2015 |
| CN | 206099417 U | 4/2017 |
| CN | 107069886 A | 8/2017 |
| CN | 107650729 A | 2/2018 |
| CN | 109617148 A | 4/2019 |
| CN | 209119263 U | 7/2019 |
| CN | 209120062 U | 7/2019 |
| CN | 110370962 A | 10/2019 |
| CN | 210111593 U | 2/2020 |
| CN | 110912392 A | 3/2020 |
| CN | 111342676 A | 6/2020 |
| KR | 20170112222 A | 10/2017 |

\* cited by examiner

VOLTAGE CONVERSION CIRCUIT, CONTROL METHOD, DC/DC CONVERTER, AND DEVICE

CROSS-REFERENCE TO RELATED APPLICATIONS

This application is a continuation of International Application No. PCT/CN2021/108478, filed on Jul. 26, 2021, which claims priority to Chinese Patent Application No. 202010761976.6, filed on Jul. 31, 2020. The disclosures of the aforementioned applications are hereby incorporated by reference in their entireties.

TECHNICAL FIELD

This application relates to voltage conversion technologies, and in particular, to a voltage conversion circuit, a control method, a DC/DC converter, and a device.

BACKGROUND

A vehicle-mounted direct current/direct current (DC/DC) converter is one of key devices of a fuel cell vehicle, a pure electric vehicle, and a hybrid vehicle, and can convert a high-voltage direct current output by a high-voltage battery into a low-voltage direct current, and the low-voltage direct current is stored in a low-voltage battery. The low-voltage battery supplies power for low-voltage components such as an electronic control unit (ECU), a power steering, brake control, and a low-voltage heat dissipation fan.

When a vehicle is started, to prevent a main relay of a power supply circuit on the vehicle from being burnt, a precharge circuit needs to be disposed in the power supply circuit, to precharge a high-voltage bus capacitor in the power supply circuit by using a high-voltage battery in the power supply circuit when the vehicle is started. The disposition of the precharge circuit reduces reliability of the power supply circuit on the vehicle.

SUMMARY

Embodiments of this application provide a voltage conversion circuit, a control method, a DC/DC converter, and a device, to improve reliability of a power supply circuit on a vehicle.

According to a first aspect, an embodiment of this application provides a voltage conversion circuit, including a failure isolation module, a soft start module, and a voltage conversion module. The voltage conversion module includes an output filter capacitor. Both a first terminal of the failure isolation module and a first terminal of the soft start module are connected to a positive electrode of a first battery, both a second terminal of the failure isolation module and a second terminal of the soft start module are connected to a first terminal of the output filter capacitor, and a second terminal of the output filter capacitor is connected to a negative electrode of the first battery. The voltage conversion module is connected to a high-voltage bus capacitor. A rated voltage of the first battery is less than or equal to a first preset voltage. The soft start module is configured to connect the first battery and the output filter capacitor, so that the first battery charges the output filter capacitor. The failure isolation module is turned on when the output filter capacitor is charged by the first battery and a voltage of the output filter capacitor is greater than or equal to a second preset voltage, so that the voltage conversion module converts a low-voltage direct current output by the first battery into a high-voltage direct current to charge the high-voltage bus capacitor, where the second preset voltage is less than the first preset voltage.

In the voltage conversion circuit in this solution, the soft start module is disposed, and a low-voltage direct current output by a battery on a low-voltage direct current side of a DC/DC converter may be converted into a high-voltage direct current by the voltage conversion circuit to charge the high-voltage bus capacitor, so that a precharge circuit does not need to be disposed in a power supply circuit of a vehicle to charge the high-voltage bus capacitor, and reliability of the power supply circuit is improved. In addition, if costs of the soft start module are less than costs of the precharge circuit, the voltage conversion circuit in this embodiment may further reduce costs of the power supply circuit.

In a possible implementation, the voltage conversion circuit further includes a soft start control module. The soft start control module is separately connected to a third terminal of the soft start module and a positive electrode of a second battery, and one terminal of the soft start control module is grounded. The soft start control module is configured to, when a device is started, receive a first soft start module control signal to control the soft start module to be turned on, so that the first battery is connected to the output filter capacitor. The device is a device in which the voltage conversion circuit is located.

In this solution, because the soft start control module is grounded and a reference ground in the soft start control module is the same as a control ground, the DC/DC converter does not need a dedicated processor to generate a control signal for controlling turn-on or turn-off of the soft start module. That is, the voltage conversion circuit in this embodiment improves the reliability of the power supply circuit of the vehicle, so that the DC/DC converter may easily implement control on the soft start module.

In a possible implementation, the soft start control module includes a first switch unit, a first resistor, and a second resistor. A first terminal of the first switch unit is separately connected to the third terminal of the soft start module and a first terminal of the first resistor, a second terminal of the first switch unit is connected to a first terminal of the second resistor, and a third terminal of the first switch unit is grounded. A second terminal of the first resistor is connected to the positive electrode of the second battery, and a second terminal of the second resistor is configured to receive the first soft start module control signal. This solution provides a specific implementation of the soft start control module.

In one manner, the first switch unit includes a first switch. Optionally, the first switch is a transistor, a first terminal of the first switch is a collector, a second terminal of the first switch is a base, and a third terminal of the first switch is an emitter. In this manner, the first switch unit is simple and is easy to implement.

In another manner, the first switch unit includes a plurality of first switches connected in series. Optionally, the first switch is a transistor, the first terminal of the first switch unit is a collector of a $1^{st}$ first switch included in the first switch unit, the second terminal of the first switch unit is a base of each first switch, and the third terminal of the first switch unit is an emitter of the last first switch included in the first switch unit. In this manner, the first switch unit enables the soft start control module to have high reliability.

In a possible implementation, the soft start control module further includes a third resistor. A first terminal of the third resistor is separately connected to the first terminal of the second resistor and the second terminal of the first switch unit, and a second terminal of the third resistor is grounded. In this solution, the disposition of the third resistor may prevent a misoperation of the first switch unit.

In a possible implementation, the soft start module includes a second switch and a fourth resistor. A first terminal of the fourth resistor is connected to the positive electrode of the first battery, a second terminal of the fourth resistor is connected to a first terminal of the second switch, a second terminal of the second switch is connected to the first terminal of the output filter capacitor, and a third terminal of the second switch is connected to the soft start control module. Optionally, the second switch is a MOS transistor, the first terminal of the second switch is a drain, the second terminal of the second switch is a source, and the third terminal of the second switch is a gate. Alternatively, the second switch is a transistor, the first terminal of the second switch is a collector, the second terminal of the second switch is an emitter, and the third terminal of the second switch is a base.

In this solution, the soft start module may be turned on or turned off, so that the output filter capacitor is not charged when the soft start module is turned off, to prevent a lifetime of the output filter capacitor from being reduced in a charging state for a long time.

In a possible implementation, the soft start module includes a fourth resistor. A first terminal of the fourth resistor is connected to the positive electrode of the first battery, and a second terminal of the fourth resistor is connected to the first terminal of the output filter capacitor.

In this solution, there is no need to dispose a soft start control module, so that complexity of the voltage conversion circuit is low.

In a possible implementation, the soft start module includes a diode. A positive electrode of the diode is connected to the positive electrode of the first battery, and a negative electrode of the diode is connected to the first terminal of the output filter capacitor.

In this solution, there is no need to dispose a soft start control module, so that complexity of the voltage conversion circuit is low.

In a possible implementation, an isolation control module is further included. The isolation control module is separately connected to a third terminal of the failure isolation module, the first terminal of the failure isolation module, the second terminal of the failure isolation module, and the positive electrode of the second battery, and one terminal of the isolation control module is grounded. The isolation control module is configured to, when the output filter capacitor is charged by the first battery and a voltage of the output filter capacitor is greater than or equal to a second preset voltage, receive a first isolation module control signal to turn on the failure isolation module.

In this solution, because the isolation control module is grounded and a reference ground in the isolation control module is the same as a control ground, the DC/DC converter does not need a dedicated processor to generate a control signal for controlling turn-on or turn-off of the failure isolation module. That is, the voltage conversion circuit in this embodiment improves reliability of the power supply circuit of the vehicle, so that the DC/DC converter may easily implement control on the failure isolation module.

In a possible implementation, the isolation control module includes a first control submodule and a second control submodule connected to the first control submodule. One terminal of the first control submodule is grounded. The second control submodule is separately connected to the third terminal of the failure isolation module, the first terminal of the failure isolation module, the second terminal of the failure isolation module, and the positive electrode of the second battery. The first control submodule is configured to receive the first isolation module control signal to control, by using the second control submodule, the failure isolation module to be turned on.

This solution provides a specific implementation of the isolation control module.

In a possible implementation, the first control submodule includes a second switch unit and a fifth resistor. A first terminal of the second switch unit is connected to the second control submodule, a second terminal of the second switch unit is connected to a first terminal of the fifth resistor, a third terminal of the second switch unit is grounded, and a second terminal of the fifth resistor is configured to receive the first isolation module control signal.

This solution provides a specific implementation of the first control submodule. In this solution, the first control submodule may be turned on when a device is started, so that the failure isolation module is turned on to charge the high-voltage bus capacitor; and the first control submodule is turned off when the device operates normally, so that the second control submodule independently controls the failure isolation module.

In one manner, the second switch unit includes a third switch. Optionally, the third switch is a transistor, a first terminal of the third switch is a collector, a second terminal of the third switch is a base, and a third terminal of the third switch is an emitter. In this manner, the second switch unit is simple and is easy to implement.

In another manner, the second switch unit includes a plurality of third switches connected in series. Optionally, the third switch is a transistor, the first terminal of the second switch unit is a collector of a 1st third switch included in the second switch unit, the second terminal of the second switch unit is a base of each third switch, and the third terminal of the second switch unit is an emitter of the last third switch included in the second switch unit. In this manner, the first control submodule has high reliability.

In a possible implementation, the first control submodule further includes a sixth resistor. A first terminal of the sixth resistor is separately connected to the second terminal of the second switch unit and the first terminal of the fifth resistor. A second terminal of the sixth resistor is connected to the third terminal of the second switch unit, and then, the second terminal of the sixth resistor and the third terminal of the second switch unit are grounded.

In this solution, the sixth resistor may prevent a misoperation of the second switch unit.

In a possible implementation, the second control submodule includes a totem pole unit and a totem pole control unit. The totem pole unit is separately connected to the third terminal of the failure isolation module, the positive electrode of the second battery, the second terminal of the failure isolation module, and the totem pole control unit. The totem pole control unit is further separately connected to the positive electrode of the second battery, the first terminal of the failure isolation module, the second terminal of the failure isolation module, and the first control submodule. This solution provides a specific implementation of the second control submodule.

In a possible implementation, the totem pole unit includes a seventh resistor, an eighth resistor, and a totem pole. A first terminal of the totem pole is connected to the third terminal of the failure isolation module, a second terminal of the totem pole is connected to a first terminal of the seventh resistor, a second terminal of the seventh resistor is connected to the positive electrode of the second battery, a third terminal of the totem pole is connected to the second terminal of the failure isolation module, and a fourth terminal of the totem pole is connected to the totem pole control unit. A fourth terminal of the totem pole is further connected to a first terminal of the eighth resistor, and a second terminal of the eighth resistor is connected to the positive electrode of the second battery. This solution provides a specific implementation of the totem pole unit.

In a possible implementation, the totem pole control unit includes a ninth resistor and a diode subunit. The diode subunit is separately connected to the totem pole of the totem pole unit, the first terminal of the failure isolation module, the second terminal of the failure isolation module, a first terminal of the ninth resistor, and the first control submodule. A second terminal of the ninth resistor is connected to the positive electrode of the second battery. This solution provides a specific implementation of the totem pole control unit.

In a possible implementation, the diode subunit includes a fourth switch and a fifth switch. A second terminal of the fourth switch is connected to the totem pole, a first terminal of the fourth switch and a first terminal of the fifth switch are connected and then are respectively connected to the first control submodule and the first terminal of the ninth resistor, a third terminal of the fourth switch is connected to the second terminal of the failure isolation module, and a second terminal and a third terminal of the fifth switch are short-circuited and then are connected to the first terminal of the failure isolation module. Optionally, the fourth switch and the fifth switch each are a transistor. A first terminal of the fourth switch is a base, a second terminal of the fourth switch is a collector, and a third terminal of the fourth switch is an emitter. A first terminal of the fifth switch is a collector, a second terminal of the fifth switch is a base, and a third terminal of the fifth switch is an emitter. This solution provides a specific implementation of the diode subunit.

The foregoing structure of the second control submodule may control, when the voltage conversion circuit operates normally, the failure isolation module to be turned on. When the voltage conversion circuit fails, the failure isolation module is controlled to be turned off, to ensure that the device in which the voltage conversion circuit is located operates normally.

In a possible implementation, the failure isolation module includes a sixth switch. A first terminal of the sixth switch is connected to the positive electrode of the first battery, a second terminal of the sixth switch is connected to the first terminal of the output filter capacitor, and a third terminal of the sixth switch is connected to the isolation control module. The third terminal of the sixth switch is the third terminal of the failure isolation module, the first terminal of the sixth switch is the first terminal of the failure isolation module, and the second terminal of the sixth switch is the second terminal of the failure isolation module. Optionally, the sixth switch is a MOS transistor, the first terminal of the sixth switch is a drain, the second terminal is a source, and the third terminal is a gate. This solution provides a specific implementation of the failure isolation module.

According to a second aspect, an embodiment of this application provides a DC/DC converter, including the voltage conversion circuit according to the first aspect or any possible implementation of the first aspect.

According to a third aspect, an embodiment of this application provides a device, including the DC/DC converter according to the second aspect.

According to a fourth aspect, an embodiment of this application provides a voltage conversion circuit control method. The method is used to control the voltage conversion circuit according to the first aspect or any one of the possible implementations of the first aspect. The method includes: when an output filter capacitor is charged by a first battery and a voltage of the output filter capacitor is greater than or equal to a second preset voltage, controlling a failure isolation module to be turned on, so that a voltage conversion module converts a low-voltage direct current output by the first battery into a high-voltage direct current to charge a high-voltage bus capacitor, where the second preset voltage is less than or equal to a rated voltage of the first battery.

In a possible implementation, the method further includes: when a device starts, controlling a soft start module to be turned on, so that after the first battery is connected to the output filter capacitor, the first battery charges the output filter capacitor, where the device is a device in which the voltage conversion circuit is located.

In a possible implementation, the voltage conversion circuit includes a soft start control module, and the controlling a soft start module to be turned on includes: sending a first soft start module control signal to the soft start control module, so that the soft start control module controls the soft start module to be turned on.

In a possible implementation, the voltage conversion circuit includes an isolation control module, and the controlling a failure isolation module to be turned on includes: sending a first isolation module control signal to the isolation control module, so that the isolation control module controls the failure isolation module to be turned on.

In a possible implementation, the method further includes: when the output filter capacitor is charged by the first battery and the voltage of the output filter capacitor is greater than or equal to the second preset voltage, controlling the soft start module to be turned off.

In a possible implementation, the voltage conversion circuit includes the soft start control module, and the controlling the soft start module to be turned off includes: sending a second soft start module control signal to the soft start control module, so that the soft start control module controls the soft start module to be turned off.

In a possible implementation, the method further includes: after charging of the high-voltage bus capacitor is completed, controlling the failure isolation module to be turned off.

In a possible implementation, the voltage conversion circuit includes the isolation control module, and the controlling the failure isolation module to be turned off includes: sending a second isolation module control signal to the isolation control module, so that the isolation control module controls the failure isolation module to be turned off.

DESCRIPTION OF EMBODIMENTS

A vehicle in embodiments of this application is a vehicle that uses a battery as a power source, for example, a fuel cell vehicle or a hybrid vehicle. The hybrid vehicle is a vehicle that includes at least a thermal power source and an electric power source.

Figure 1:
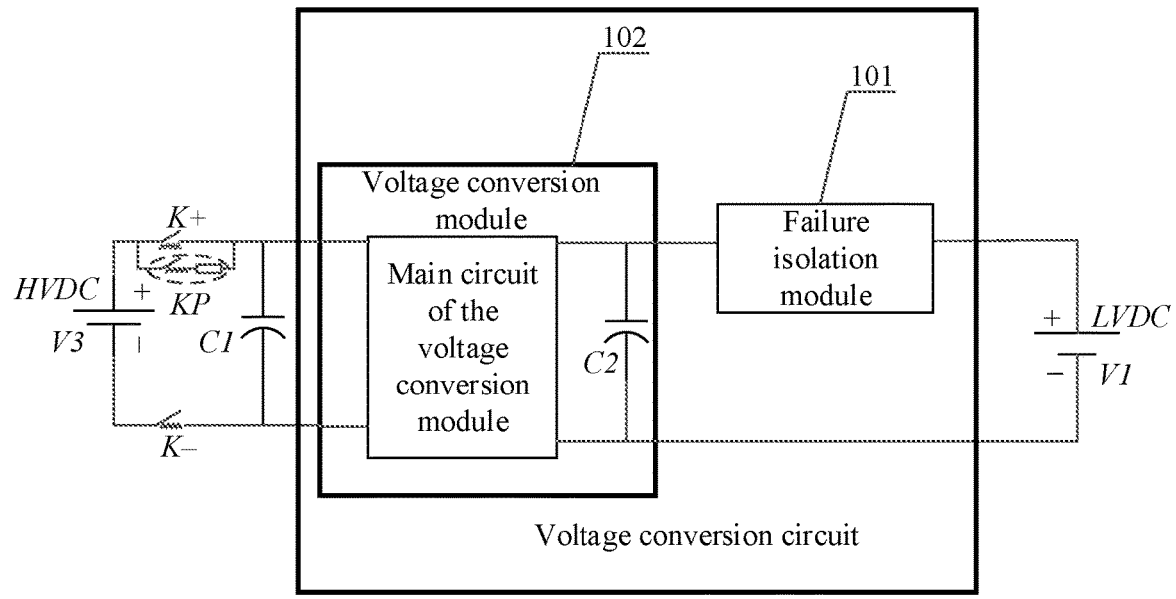
FIG. 1 is a schematic diagram 1 of a structure of a power supply circuit on a current vehicle.

FIG. 1 is a schematic diagram 1 of a structure of a power supply circuit on a current vehicle. With reference to FIG. 1, the power supply circuit includes a third battery V3, a first relay K+, a second relay K−, a precharge circuit KP, a high-voltage bus capacitor C1, and a DC/DC converter on a high-voltage direct current (HVDC) side, and a first battery V1 on a low-voltage direct current (LVDC) side, where a rated voltage of the first battery V1 is lower than a rated voltage of the third battery V3. The precharge circuit KP includes one contactor and one resistor. The first relay K+ and the second relay K− may also be referred to as main relays.

The DC/DC converter includes a voltage conversion circuit, the voltage conversion circuit includes a failure isolation module 101 and a voltage conversion module 102, and the voltage conversion module 102 includes an output filter capacitor C2. A first terminal of the output filter capacitor C2 is connected to a second terminal of the failure isolation module 101, a first terminal of the failure isolation module 101 is connected to a positive electrode of the first battery V1, and a negative electrode of the first battery V1 is connected to a second terminal of the output filter capacitor C2. The failure isolation module 101 may be a switching transistor, and the switching transistor may be, for example, a MOS transistor or a relay.

When the DC/DC converter operates normally in a forward direction, the failure isolation module 101 is in a conduction state, a high-voltage direct current output by the third battery V3 may be converted into a low-voltage direct current by the voltage conversion module 102, and the low-voltage direct current is stored in the first battery V1, so that the first battery V1 supplies power to low-voltage components such as an ECU, power steering, brake control, and a low-voltage heat dissipation fan on the vehicle.

When there is an internal failure in the DC/DC converter, a voltage between two terminals of the output filter capacitor C2 on an output side of the voltage conversion module 102 is very low, and is almost 0. If the failure isolation module 101 continues to be in a conduction state, a voltage between two terminals of the first battery V1 is bound to be pulled down, the first battery V1 cannot continuously supply power to the low-voltage components on the vehicle, and normal operation of the vehicle is affected. In addition, because of a large voltage difference between the positive electrode of the first battery V1 and the first terminal of the output filter capacitor C2, if the failure isolation module 101 continues to be in a conduction state, a current passing through the failure isolation module 101 is very large, and may easily damage the failure isolation module 101. Therefore, when the voltage between the two terminals of the output filter capacitor C2 is very low, the failure isolation module 101 may be turned off to cut off a channel between the DC/DC converter and the first battery V1, to prevent the failure isolation module 101 from being damaged and the voltage between the two terminals of the first battery V1 from being pulled down, so that the first battery V1 may continue to supply power to the low-voltage components on the vehicle, to ensure normal operation of the vehicle.

The voltage conversion circuit may include an isolation control module that controls the failure isolation module 101 to be turned on or turned off. When the DC/DC converter operates normally in a forward operation, the isolation control module may enable the failure isolation module 101 to be turned on, and when there is an internal failure in the DC/DC converter, the failure isolation module 101 is turned off.

Still with reference to FIG. 1, when the vehicle is started, a voltage between two terminals of the high-voltage bus capacitor C1 is very low or is 0, and load resistance includes only conductor resistance, resistance of a first relay K+ contact, and a resistance of a second relay K− contact. If the first relay K+ and the second relay K− are directly turned on, an instant short circuit is formed, and the first relay K+ and the second relay K− are burnt. Therefore, to prevent the first relay K+ and the second relay K− from being burnt, the precharge circuit KP needs to be disposed to precharge the high-voltage bus capacitor C1 by using a high-voltage battery after the vehicle receives a start signal. A process of precharging the high-voltage bus capacitor C1 may be referred to as a high-voltage precharge process. The precharge circuit includes the contactor, and the contactor is easy to adhere. Therefore, if the disposition of the precharge circuit can be omitted, reliability of the power supply circuit may be improved.

It may be understood that if the voltage conversion circuit may convert a low-voltage direct current output by the first battery V1 into a high-voltage direct current to precharge the high-voltage bus capacitor C1, the disposition of the precharge circuit KP may be omitted. However, when the vehicle is started, because each component on the vehicle is not started, a voltage at a low-voltage output terminal of the voltage conversion circuit is 0. As described above, to prevent the failure isolation module 101 from being damaged and the voltage between the two terminals of the first battery V1 from being pulled down, a channel between the voltage conversion circuit and first battery V1 is cut off by the failure isolation module 101. Therefore, the voltage conversion circuit cannot convert the low-voltage direct current output by the first battery V1 into the high-voltage direct current to precharge the high-voltage bus capacitor C1. That is, the DC/DC converter in the current vehicle has a problem that the precharge circuit cannot be omitted, because there is the failure isolation module 101.

To resolve the foregoing technical problem, the voltage conversion circuit in this application is proposed. The following describes this application by using specific embodiments.

Figure 2:
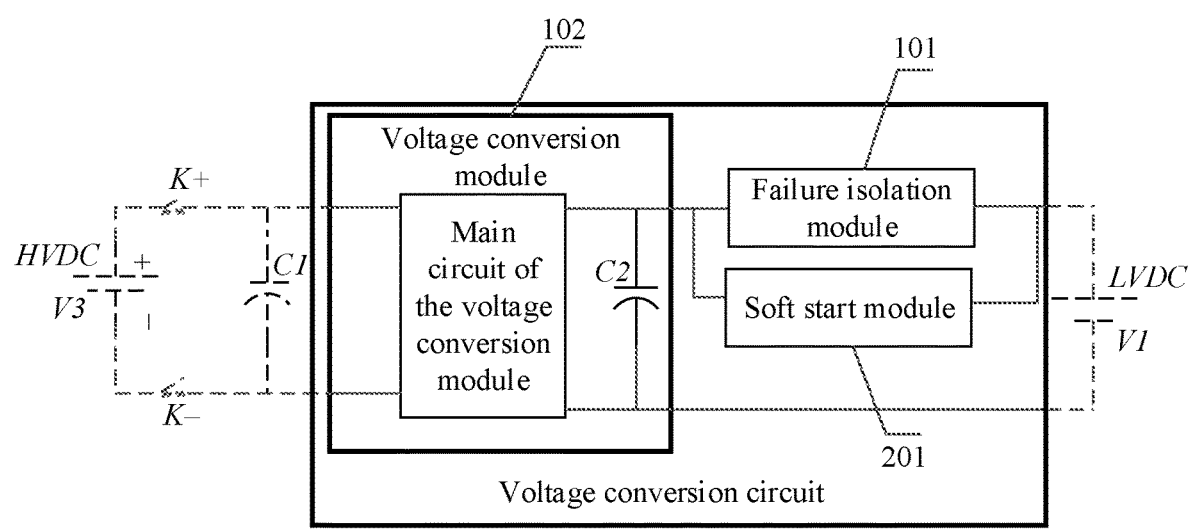
FIG. 2 is a schematic diagram 1 of a voltage conversion circuit according to an embodiment of this application.

FIG. 2 is a schematic diagram 1 of a voltage conversion circuit according to an embodiment of this application. With reference to FIG. 2, the voltage conversion circuit in this embodiment includes a failure isolation module 101, a soft start module 201, and a voltage conversion module 102. The voltage conversion module 102 includes an output filter capacitor C2. The voltage conversion circuit in this embodiment is a part of a DC/DC converter.

Both a first terminal of the failure isolation module 101 and a first terminal of the soft start module 201 are connected to a positive electrode of a first battery V1, and both a second terminal of the failure isolation module 101 and a second terminal of the soft start module 201 are connected to a first terminal of the output filter capacitor C2. A second terminal of the output filter capacitor C2 is connected to a negative electrode of the first battery V1; and the voltage conversion module 102 is further connected to a high-voltage bus capacitor C1, and a rated voltage of the first battery V1 is equal to a first preset voltage.

The soft start module 201 is configured to connect the first battery V1 and the output filter capacitor C2, so that the first battery V1 charges the output filter capacitor C2.

The failure isolation module 101 is turned on when the output filter capacitor C2 is charged by the first battery V1 and the voltage of the output filter capacitor C2 is greater than or equal to a second preset voltage, so that the voltage conversion module 102 converts a low-voltage current output by the first battery V1 into a high-voltage current to charge the high-voltage bus capacitor C1, where the second preset voltage is less than the first preset voltage.

The first preset voltage in this embodiment may be 12 V, that is, the first battery V1 may be a 12 V storage battery.

In this embodiment, the second preset voltage is less than the first preset voltage, and a difference between the first preset voltage and the second preset voltage is less than a first voltage. It may be understood that a difference between the first preset voltage and the second preset voltage is a voltage between two terminals of the failure isolation module 101. Therefore, the first voltage needs to meet the following condition: When the voltage between the two terminals of the failure isolation module 101 is the first voltage, a current passing through the failure isolation module 101 is insufficient to damage the failure isolation module 101.

For example, the second preset voltage is equal to a product of the first preset voltage and x/y, where y is a quantity of time constants included in duration for charging the voltage between the two terminals of the output filter capacitor C2 from 0 V to a second voltage, x is a quantity of time constants included in duration for charging the output filter capacitor C2 by the first battery V1, and the x is less than or equal to the y. The second voltage is maximum power that may be charged to the voltage between the two terminals of the output filter capacitor C2. Optionally, one time constant may be 10 ms.

In a specific implementation, when a vehicle is started, both the soft start module 201 and the failure isolation module 101 are turned off. A processor of the vehicle sends a high-voltage precharge instruction to the DC/DC converter, and after receiving the high-voltage precharge instruction, the DC/DC converter controls the soft start module 201 to be turned on. Because the first terminal of the soft start module 201 is connected to the positive electrode of the first battery V1, the second terminal of the soft start module 201 is connected to the first terminal of the output filter capacitor C2, and the second terminal of the output filter capacitor C2 is connected to the negative electrode of the first battery V1, the conduction of the soft start module 201 may enable a charge loop to be formed between the first battery V1 and the output filter capacitor C2, so that the first battery V1 charges the output filter capacitor C2.

The DC/DC converter monitors the voltage between the two terminals of the output filter capacitor C2 in real time. When the voltage between the two terminals of the output filter capacitor C2 is detected to be greater than or equal to the second preset voltage, the DC/DC converter controls the failure isolation module 101 to be turned on. Alternatively, from a start moment at which the soft start module 201 is turned on, after duration corresponding to x time constants, the DC/DC converter controls the soft start module 201 to be turned off and the failure isolation module 101 to be turned on. After the failure isolation module 101 is turned on, a low-voltage direct current output by the first battery may be converted into a high-voltage direct current by the voltage conversion module 102, to charge the high-voltage bus capacitor C1. Based on the foregoing description of the second preset voltage, when the output filter capacitor C2 is charged by the first battery V1 and the voltage between two the two terminals of the output filter capacitor C2 is greater than or equal to the second preset voltage, the failure isolation module 101 cannot be damaged when the failure isolation module 101 is turned on.

After charging of the high-voltage bus capacitor C1 is completed, the DC/DC converter may control the failure isolation module 101 to be turned off, and sends information indicating completion of high-voltage precharging to the processor of the vehicle.

In another specific implementation, after being connected by the soft start module 201, the first battery V1 and the output filter capacitor C2 are in a constant on state. When the vehicle is not started or the DC/DC converter does not convert a high-voltage direct current into a low-voltage direct current, the failure isolation module 101 is turned off. In this case, the first battery V1 continuously charges the output filter capacitor C2. When the vehicle is started, the failure isolation module 101 is turned off, and a processor of the vehicle sends a high-voltage precharge instruction to the DC/DC converter. After receiving the high-voltage precharge instruction, the DC/DC converter determines whether the output filter capacitor C2 is charged by the first battery V1 and the voltage of the output filter capacitor C2 is greater than or equal to the second preset voltage. If yes, the failure isolation module 101 is controlled to be turned on, or if no, when it is detected that the voltage of the output filter capacitor C2 is greater than or equal to the second preset voltage, the failure isolation module 101 is controlled to be turned on. After the failure isolation module 101 is turned on, a low-voltage direct current output by the first battery may be converted into a high-voltage direct current by the voltage conversion module 102, to charge the high-voltage bus capacitor C1.

In a vehicle startup process, the low-voltage direct current output by the first battery V1 may be converted into the high-voltage direct current by the voltage conversion module 102, to charge the high-voltage bus capacitor C1. Therefore, the precharge circuit on the power supply circuit of the vehicle may be omitted, and reliability of the power supply circuit of the vehicle is improved.

In the voltage conversion circuit in this embodiment, the soft start module is disposed, and a low-voltage direct current output by a battery on a low-voltage direct current side of the DC/DC converter may be converted into a high-voltage direct current by the voltage conversion circuit to charge the high-voltage bus capacitor, so that a precharge circuit does not need to be disposed in the power supply circuit of the vehicle to charge the high-voltage bus capacitor, and the reliability of the power supply circuit is improved. In addition, if costs of the soft start module are less than costs of the precharge circuit, the voltage conversion circuit in this embodiment may further reduce costs of the power supply circuit.

The following describes the failure isolation module and the soft start module in the foregoing embodiment by using a specific embodiment.

For the failure isolation module 101, in one manner, the failure isolation module 101 may include a sixth switch. A first terminal of the sixth switch is connected to the positive electrode of the first battery V1, a second terminal of the sixth switch is connected to the first terminal of the output filter capacitor C2, and a third terminal of the sixth switch may be configured to receive a first control signal to turn on the sixth switch, or may be configured to receive a second control signal to turn off the sixth switch. That is, the first terminal of the sixth switch is the first terminal of the failure isolation module 101, the second terminal of the sixth switch is the second terminal of the failure isolation module 101, and the third terminal of the sixth switch is the third terminal of the failure isolation module 101.

Optionally, the sixth switch is a MOS transistor or a relay. When the sixth switch is a MOS transistor, the first terminal of the sixth switch is a drain, the second terminal is a source, and the third terminal is a gate.

The following describes the soft start module 201.

In a first solution, the soft start module 201 includes a second switch and a fourth resistor. A first terminal of the fourth resistor is connected to the positive electrode of the first battery V1, a second terminal of the fourth resistor is connected to a first terminal of the second switch, a second terminal of the second switch is connected to the first terminal of the output filter capacitor C2, and a third terminal of the second switch may be configured to receive a third control signal to turn on the second switch, or may be configured to receive a fourth control signal to turn off the second switch. That is, the first terminal of the fourth resistor is a first terminal of the soft start module 201, the second terminal of the second switch is a second terminal of the soft start module 201, and the third terminal of the second switch is a third terminal of the soft start module 201.

The fourth resistor may prevent the second switch from being burnt after the charge loop is formed between the first battery V1 and the output filter capacitor C2, to improve security of the second switch. The fourth resistor may be a thermistor, to further improve security of the second switch. The fourth resistor may alternatively be a common resistor.

Optionally, the second switch is a MOS transistor, a transistor, or a thyristor. When the second switch is a MOS transistor, the first terminal of the second switch is a drain, the second terminal of the second switch is a source, and the third terminal of the second switch is a gate. When the second switch is a transistor, the first terminal of the second switch is a collector, the second terminal of the second switch is an emitter, and the third terminal of the second switch is a base.

Figure 3A:
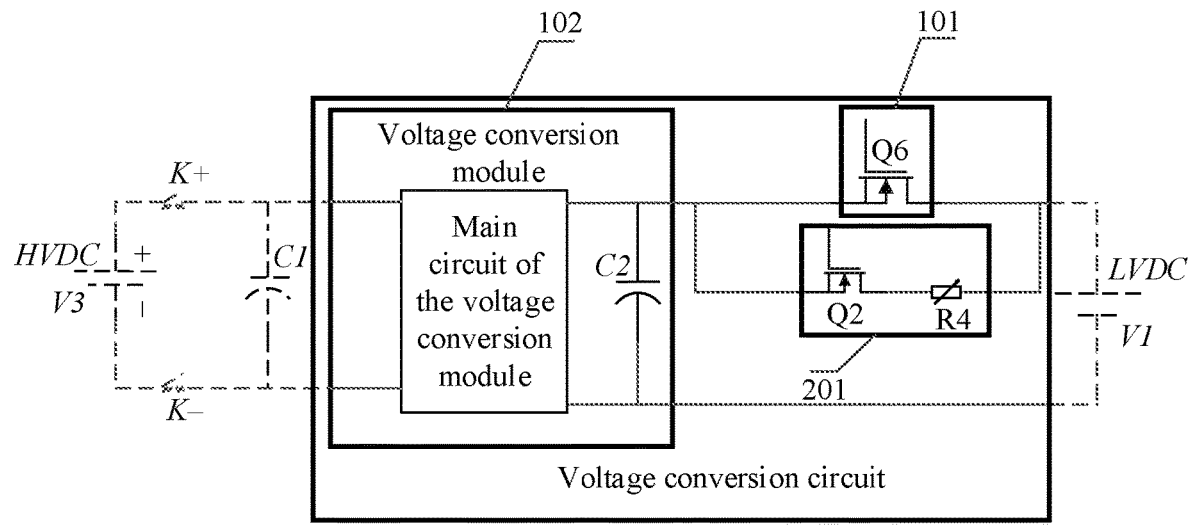
FIG. 3A is a schematic diagram 2 of a voltage conversion circuit according to an embodiment of this application.
Figure 3B:
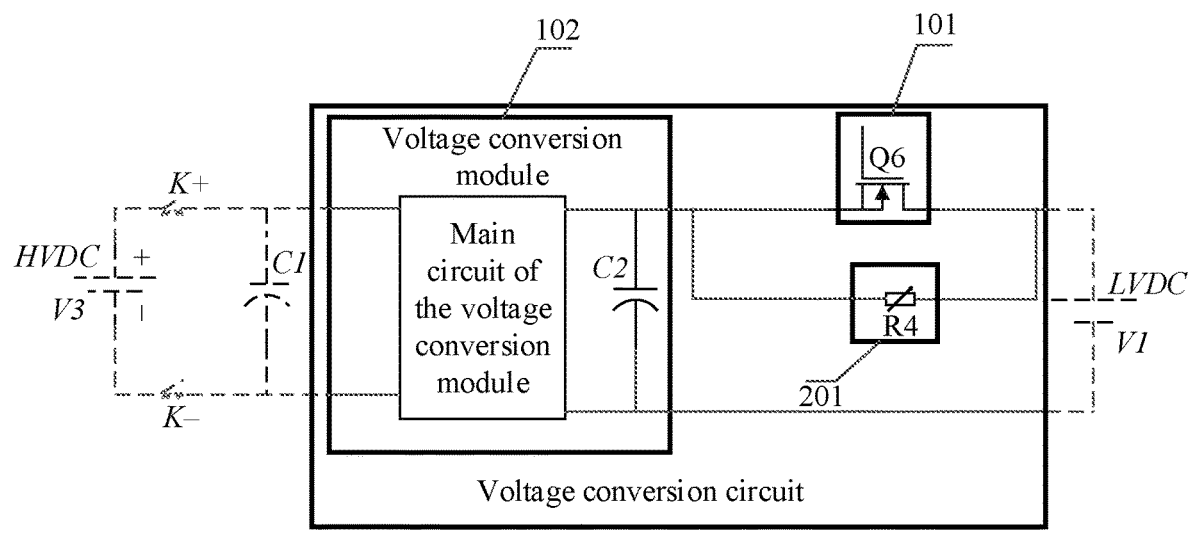
FIG. 3B is a schematic diagram 3 of a voltage conversion circuit according to an embodiment of this application.
Figure 3C:
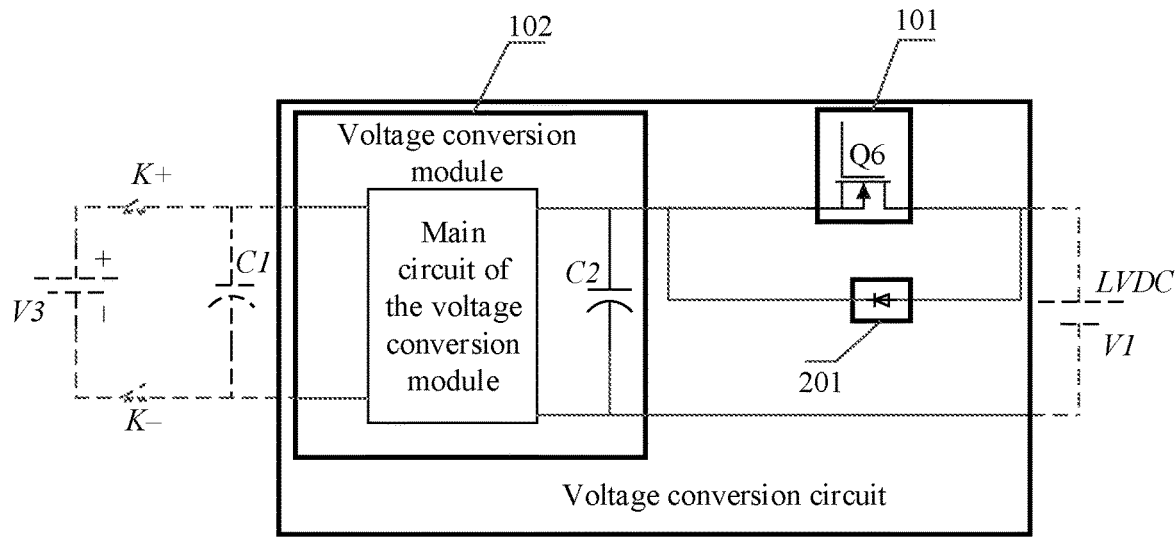
FIG. 3C is a schematic diagram 4 of a voltage conversion circuit according to an embodiment of this application.

A schematic diagram of a voltage conversion circuit corresponding to the first solution of the soft start module 201 may be shown by solid lines in FIG. 3A to FIG. 3C. With reference to FIG. 3A, the voltage conversion circuit includes the sixth switch Q6, the second switch Q2, the fourth resistor R4, and the voltage conversion module 102. The voltage conversion module 102 includes the output filter capacitor C2. Both the drain of the sixth switch Q6 and the first terminal of the fourth resistor R4 are connected to the positive electrode of the first battery V1, both the source of the sixth switch Q6 and the source of the second switch Q2 are connected to the first terminal of the output filter capacitor C2, the drain of the second switch Q2 is connected to the second terminal of the fourth resistor R4, and the second terminal of the output filter capacitor C2 is connected to the negative electrode of the first battery V1.

Still with reference to FIG. 3A, when the vehicle is started, the sixth switch Q6 is turned off. The processor of the vehicle sends a high-voltage precharge instruction to the DC/DC converter. After receiving the high-voltage precharge instruction, the DC/DC converter sends a third control signal to the gate of the second switch Q2, so that the second switch Q2 is turned on, a charge loop is formed between the first battery V1 and the output filter capacitor C2, and the first battery V1 starts to charge the output filter capacitor C2. When the DC/DC converter determines that the output filter capacitor C2 is charged by the first battery V1 and the voltage of the output filter capacitor C2 is greater than or equal to the second preset voltage, the DC/DC converter sends the first control signal to the gate of the sixth switch Q6, so that the sixth switch Q6 is turned on. In this case, the voltage conversion module 102 may convert the low-voltage current output by the first battery V1 into the high-voltage current to charge the high-voltage bus capacitor C1. Optionally, when the output filter capacitor C2 is charged by the first battery V1 and the voltage of the output filter capacitor C2 is greater than or equal to the second preset voltage, the DC/DC converter may further send a fourth control signal to the gate of the second switch Q2, so that the second switch Q2 is turned off.

After charging of the high-voltage bus capacitor C1 is completed, the voltage of the output filter capacitor C2 decreases gradually. To prevent the voltage of the first battery V1 from being pulled down and the sixth switch Q6 from being damaged, the DC/DC converter sends a second control signal to the gate of the sixth switch Q6 to turn off the sixth switch Q6. After charging of the high-voltage bus capacitor C1 is completed, the DC/DC converter further sends information indicating completion of high-voltage precharging to the processor of the vehicle.

Optionally, after receiving the information indicating the completion of high-voltage precharging, the processor of the vehicle may control the first relay and the second relay to be turned on, and send an instruction of converting a high-voltage direct current into a low-voltage direct current to the DC/DC converter. Because the first relay and the second relay are turned on, the voltage of the output filter capacitor C2 gradually rises. After the DC/DC converter detects that the voltage of the output filter capacitor C2 is greater than the first preset threshold, the DC/DC converter sends a first control signal to the gate of the sixth switch Q6 to turn on the sixth switch Q6. The voltage conversion module 102 in the voltage conversion circuit starts to convert a high-voltage direct current into a low-voltage direct current to supply power to low-voltage components on the vehicle, and the vehicle starts to run normally. In a vehicle running process, if the DC/DC converter detects that the voltage conversion module 102 fails, for example, the DC/DC converter detects that the voltage at the first terminal of the output filter capacitor C2 is lower than a second preset threshold, and the DC/DC converter sends the second control signal to the gate of the sixth switch Q6 to turn off the sixth switch Q6, thereby preventing the voltage of the first battery V1 from being pulled down and the failure isolation module 101 from being burnt.

In a second solution, the soft start module 201 includes the fourth resistor. The first terminal of the fourth resistor is connected to the positive electrode of the first battery V1, and the second terminal of the fourth resistor is connected to the first terminal of the output filter capacitor C2. That is, the first terminal of the fourth resistor is the first terminal of the soft start module 201, and the second terminal of the fourth resistor is the second terminal of the soft start module 201. The fourth resistor may be a thermistor or a common resistor.

The soft start module 201 includes the fourth resistor, and has no switching transistor. Therefore, the first battery V1 and the voltage conversion module 102 are connected through the fourth resistor and are in a constant on state. When the vehicle is not started or the DC/DC converter does not convert a high-voltage direct current into a low-voltage direct current, the sixth switch Q6 is turned off. In this case, the first battery V1 charges the output filter capacitor.

A schematic diagram of a voltage conversion circuit corresponding to the second specific implementation of the soft start module 201 may be shown by solid lines in FIG. 3B. With reference to FIG. 3B, the voltage conversion circuit includes the sixth switch Q6, the fourth resistor R4, and the voltage conversion module 102. The voltage conversion module 102 includes the output filter capacitor C2. Both the drain of the sixth switch Q6 and the first terminal of the fourth resistor R4 are connected to the positive electrode of the first battery V1, both the source of the sixth switch Q6 and the second terminal of the fourth resistor R4 are connected to the first terminal of the output filter capacitor C2, and the second terminal of the output filter capacitor C2 is connected to the negative electrode of the first battery V1.

Figure 4:
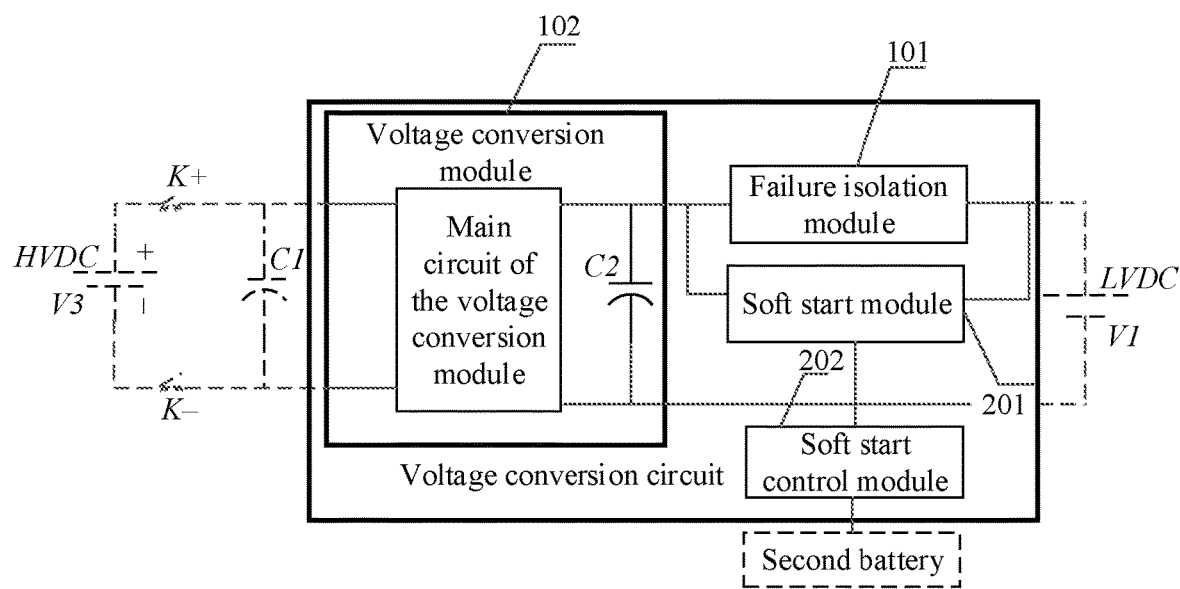
FIG. 4 is a schematic diagram 5 of a voltage conversion circuit according to an embodiment of this application.

With reference to FIG. 4, when the vehicle is started, the sixth switch Q6 is turned off. The processor of the vehicle sends a high-voltage precharge instruction to the DC/DC converter. After receiving the high-voltage precharge instruction, the DC/DC converter determines whether the output filter capacitor C2 is charged by the first battery V1 and the voltage of the output filter capacitor C2 is greater than or equal to the second preset voltage. If yes, the DC/DC converter sends a first control signal to the gate of the sixth switch Q6 to turn on the sixth switch Q6; or if no, when detecting that the voltage of the filter capacitor C2 is greater than or equal to the second preset voltage, the DC/DC converter sends the first control signal to the gate of the sixth switch Q6 to turn on the sixth switch Q6. In this case, the voltage conversion module 102 may convert a low-voltage current output by the first battery V1 into a high-voltage current to charge the high-voltage bus capacitor C1.

For a specific implementation after charging of the high-voltage bus capacitor C1 is completed, refer to a specific implementation of the voltage conversion circuit shown in FIG. 3A to FIG. 3C after the charging of the high-voltage bus capacitor C1 is completed. Details are not described herein again.

In a third solution, the soft start module 201 includes a diode. A positive electrode of the diode is connected to the positive electrode of the first battery V1, and a negative electrode of the diode is connected to the first terminal of the output filter capacitor C2. That is, the positive electrode of the diode is the first terminal of the soft start module 201, and the negative electrode of the diode is the second terminal of the soft start module 201.

The soft start module 201 includes the diode, and has no switching transistor. Therefore, the first battery V1 and the voltage conversion module 102 are connected through the fourth resistor and are in a constant on state. When the vehicle is not started or the DC/DC converter does not convert a high-voltage direct current into a low-voltage direct current, the sixth switch Q6 is turned off. In this case, the first battery V1 charges the output filter capacitor.

A schematic diagram of a voltage conversion circuit corresponding to the third solution of the soft start module 201 may be shown by solid lines in FIG. 3C.

This embodiment provides a specific implementation of the failure isolation module and the soft start module in the voltage conversion circuit.

When the soft start module includes the second switch and the fourth resistor, the second switch is turned on or off based on a control signal input to the second switch. However, because a reference ground of the second switch in the soft start module is different from a control ground, a dedicated processor in the DC/DC converter needs to generate a third control signal for controlling the second switch to be turned on and generate a fourth control signal for controlling the second switch to be turned off. Therefore, that the DC/DC converter controls the soft start module is complex. To make that the DC/DC converter controls the soft start module easy to implement, in this embodiment, a further improvement is made on the voltage conversion circuit in which the soft start module includes the second switch and the fourth resistor. With reference to FIG. 4, the voltage conversion circuit in this embodiment further includes a soft start control module 202 based on the foregoing implementations.

The soft start control module 202 is separately connected to the third terminal of the soft start module 201 and the positive electrode of the second battery, and a difference between a rated voltage of the second battery and a voltage at a second terminal of an isolation module 101 in a normal running process of the vehicle is greater than or equal to a second voltage. One terminal of the soft start control module 202 is grounded. The soft start control module 202 is configured to receive a first soft start module control signal to control the soft start module 201 to be turned on, or is configured to receive a second soft start module control signal to control the soft start module 201 to be turned off. In a normal running process of the vehicle, the voltage at the second terminal of the isolation module 101 is slightly lower than the voltage of the positive electrode of the first battery. The second voltage may be greater than or equal to 6 V and is less than or equal to 15 V, for example, the second voltage is 12 V.

The soft start control module 202 includes a first switch unit, a first resistor, and a second resistor. A first terminal of the first resistor is connected to the positive electrode of the second battery, a second terminal of the first resistor is connected to a first terminal of the first switch unit, the first terminal of the first switch unit is further connected to the third terminal of the soft start module 201, a second terminal of the first switch unit is connected to a first terminal of the second resistor, a third terminal of the first switch unit is grounded, and a second terminal of the second resistor is configured to receive the first soft start module control signal to control the soft start module 201 to be turned on, or is configured to receive the second soft start module control signal to control the soft start module 201 to be turned off.

Optionally, the soft start control module 202 further includes a third resistor. A first terminal of the third resistor is separately connected to the second terminal of the first switch unit and the first terminal of the second resistor. A second terminal of the third resistor is connected to the third terminal of the first switch unit, and then, the second terminal of the third resistor and the third terminal of the first switch unit are grounded. The third resistor may prevent a misoperation of a switch in the first switch unit, and the first resistor and the second resistor are current limiting resistors.

For the first switch unit, in a first solution, the first switch unit may include a plurality of first switches connected in series. The first switch may be a transistor. In this case, the first terminal of the first switch unit may be a collector of a $1^{st}$ first switch included in the first switch unit, the second terminal of the first switch unit may be a base of each first switch, and the third terminal of the first switch unit may be an emitter of the last first switch included in the first switch unit. In this solution, if some of the first switches in the first switch unit are short-circuited, the remaining first switches operate normally, the soft start control module may normally control the soft start module to be turned on or turned off. That is, the plurality of first switches connected in series that are included in the first switch unit may improve reliability of the soft start control module, thereby improving reliability of the voltage conversion circuit.

Figure 5A:
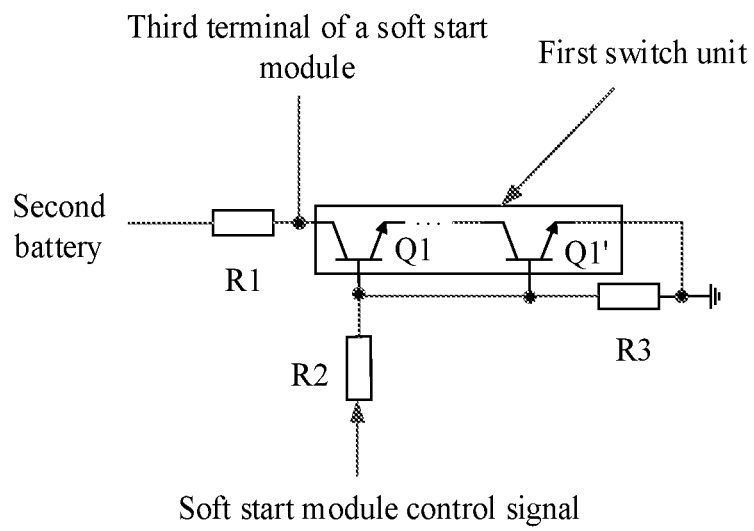
FIG. 5A is a schematic diagram 1 of a soft start control module according to an embodiment of this application.

A schematic diagram of a structure of the soft start control module corresponding to the first solution may be shown in FIG. 5A. With reference to FIG. 5A, the soft start control module 202 includes the first switch unit, the first resistor R1, the second resistor R2, and the third resistor R3, and the first switch unit includes the plurality of first switches connected in series: Q1, Q1', . . . . The first terminal of the first resistor R1 is connected to the positive electrode of the second battery, the second terminal of the first resistor R1 is connected to a collector of the $1^{st}$ first switch Q1 in the first switch unit, the collector of the $1^{st}$ first switch Q1 is further connected to the third terminal of the soft start module 201, a base of each first switch included in the first switch unit is separately connected to the first terminal of the second resistor R2 and the first terminal of the third resistor R3, and an emitter of the last first switch Q1' included in the first switch unit is grounded. The second terminal of the third resistor R3 is connected to the emitter of the first switch Q1', and then, the second terminal of the third resistor R3 and the emitter of the first switch Q1' are grounded.

In a second solution, the first switch unit is a first switch. The first switch may be a transistor. In this case, the first terminal of the first switch is a collector, the second terminal of the first switch is a base, and the third terminal of the first switch is an emitter. In this solution, the structure of the soft start control module is simple.

Figure 5B:
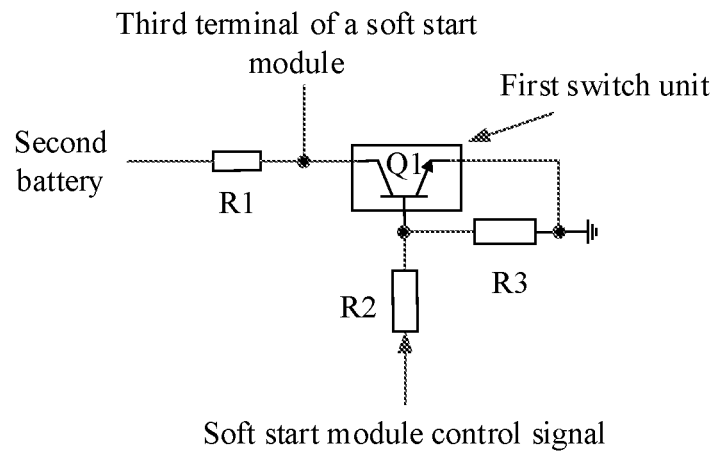
FIG. 5B is a schematic diagram 2 of a soft start control module according to an embodiment of this application.

A schematic diagram of a structure of the soft start control module corresponding to the second solution may be shown in FIG. 5B. With reference to FIG. 5B, the soft start control module 202 includes the first switch Q1, the first resistor R1, the second resistor R2, and the third resistor R3. The first terminal of the first resistor R1 is connected to the positive electrode of the second battery, the second terminal of the first resistor R1 is connected to the collector of the first switch Q1, the collector of the first switch Q1 is further connected to the third terminal of the soft start module 201, the base of the first switch Q1 is separately connected to the first terminal of the second resistor R2 and the first terminal of the third resistor R3, and the emitter of the first switch Q1 is grounded. The second terminal of the second resistor R2 is configured to input the first soft start module control signal or the second soft start module control signal. The second terminal of the third resistor R3 is connected to the emitter of the first switch Q1, and then, the second terminal of the third resistor R3 and the emitter of the first switch Q1 are grounded.

Figure 6:
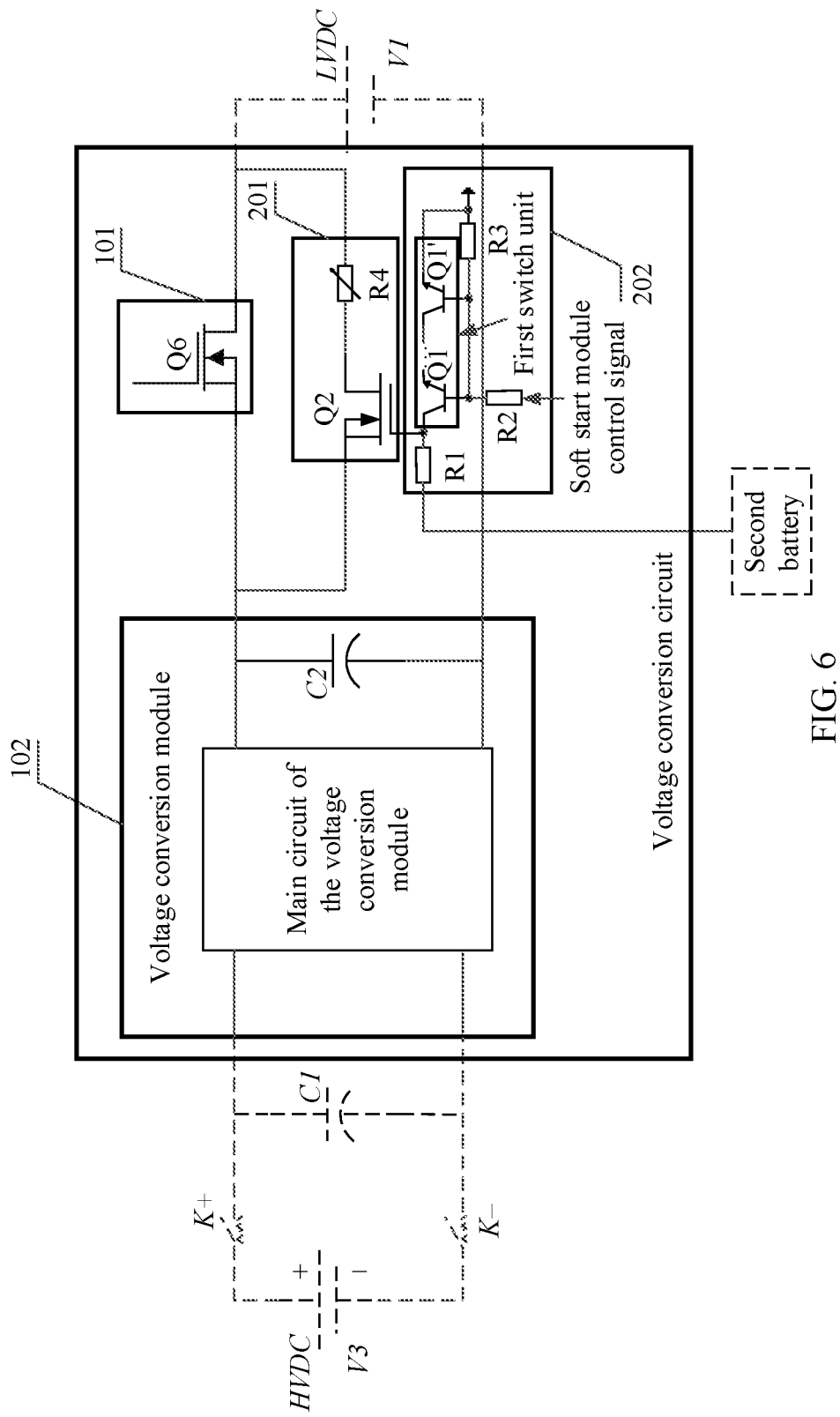
FIG. 6 is a schematic diagram 6 of a voltage conversion circuit according to an embodiment of this application.

A schematic diagram of a specific voltage conversion circuit corresponding to this embodiment may be shown by solid lines in FIG. 6. With reference to FIG. 6, the voltage conversion circuit includes the failure isolation module 101, the soft start module 201, the soft start control module 202, and the voltage conversion module 102. The voltage conversion module 102 includes the output filter capacitor C2. The failure isolation module 101 includes the sixth switch Q6, and the soft start module 201 includes the second switch Q2 and the fourth resistor R4. The soft start control module 202 includes the first switch unit, the first resistor R1, the second resistor R2, and the third resistor R3, and the first switch unit includes the plurality of first switches connected in series: Q1, Q1', . . . . Both the drain of the sixth switch Q6 and the first terminal of the fourth resistor R4 are connected to the positive electrode of the first battery V1, both the source of the sixth switch Q6 and the source of the second switch Q2 are connected to the first terminal of the output filter capacitor C2, the drain of the second switch Q2 is connected to the second terminal of the resistor R4, and the second terminal of the output filter capacitor C2 is connected to the negative electrode of the first battery V1. The first terminal of the first resistor R1 is connected to the positive electrode of the second battery, the second terminal of the first resistor R1 is connected to the collector of the $1^{st}$ first switch Q1 in the first switch unit, the collector of the $1^{st}$ first switch Q1 is further connected to the gate of the second switch Q2, the base of each first switch included in the first switch unit is separately connected to the first terminal of the second resistor R2 and the first terminal of the third resistor R3, and the emitter of the last first switch Q1' included in the first switch unit is grounded. The second terminal of the second resistor R2 is configured to input the first soft start module control signal or the second soft start module control signal. The second terminal of the third resistor R3 is connected to the emitter of the first switch Q1', and then, the second terminal of the third resistor R3 and the emitter of the first switch Q1' are grounded.

With reference to FIG. 6, when the vehicle is started, the sixth switch Q6 is turned off. The processor of the vehicle sends a high-voltage precharge instruction to the DC/DC converter. After receiving the high-voltage precharge instruction, the DC/DC converter sends the first soft start module control signal to the soft start control module, where the first soft start module control signal is a low-level signal (less than or equal to 0.9 V). The low-level signal is input from the second terminal of the second resistor R2, so that a difference between a base voltage and an emitter voltage of each first switch in the first switch unit is less than 0.7 V, and each first switch cannot be turned on and is in an off state. After each first switch is turned off, the voltage of the gate of the second switch Q2 is the voltage of the positive electrode of the second battery. If the rated voltage of the first battery is 12 V, the rated voltage of the second battery may be 24 V, that is, the voltage of the positive electrode of the second battery is 24 V, and the voltage of the gate of the second switch Q2 is 24 V. The voltage of the source of the second switch Q2 is the voltage at the first terminal of the output filter capacitor C2. When the vehicle is started, the voltage at the first terminal of the output filter capacitor C2 is 0. Therefore, the voltage of the gate of the second switch Q2 is far greater than the voltage of the source of the second switch Q2, the second switch Q2 is turned on, a charge loop is formed between the first battery V1 and the output filter capacitor C2, and the first battery V1 starts to charge the output filter capacitor C2. When the filter capacitor C2 is charged by the first battery V1 and the voltage of the filter capacitor C2 is greater than or equal to the second preset voltage, the DC/DC converter sends the first control signal to the third terminal of the sixth switch Q6 to turn on the sixth switch Q6. In this case, the voltage conversion module 102 may convert the low-voltage current output by the first battery V1 into the high-voltage current, to charge the high-voltage bus capacitor C1.

Optionally, when the DC/DC converter determines that the output filter capacitor C2 is charged by the first battery V1 and the voltage of the output filter capacitor C2 is greater than or equal to the second preset voltage, the DC/DC converter may further send the second soft start module control signal to the soft start control module, where the second soft start module control signal is a high-level signal (a level signal greater than or equal to 3.3 V). The high-level signal is input from the second terminal of the second resistor R2, a difference between the base voltage and the emitter voltage of each first switch in the first switch unit is greater than 0.7 V, and each first switch is turned on. After each first switch is turned on, the gate of the second switch Q2 is equivalent to being grounded, that is, the voltage of the gate of the second switch Q2 is 0. The second switch Q2 cannot be turned on, and is in an off state, that is, the soft start module 201 is turned off.

For a specific implementation after charging of the high-voltage bus capacitor C1 is completed, refer to a specific implementation of the voltage conversion circuit shown in FIG. 3 after the charging of the high-voltage bus capacitor C1 is completed. Details are not described herein again.

In this implementation, because the soft start control module is grounded and a reference ground in the soft start control module is the same as a control ground, the DC/DC converter does not need a dedicated processor to generate a control signal for controlling turn-on or turn-off of the soft start module. That is, the voltage conversion circuit in this embodiment improves the reliability of the power supply circuit of the vehicle, so that the DC/DC converter may easily implement control on the soft start module.

Figure 7:
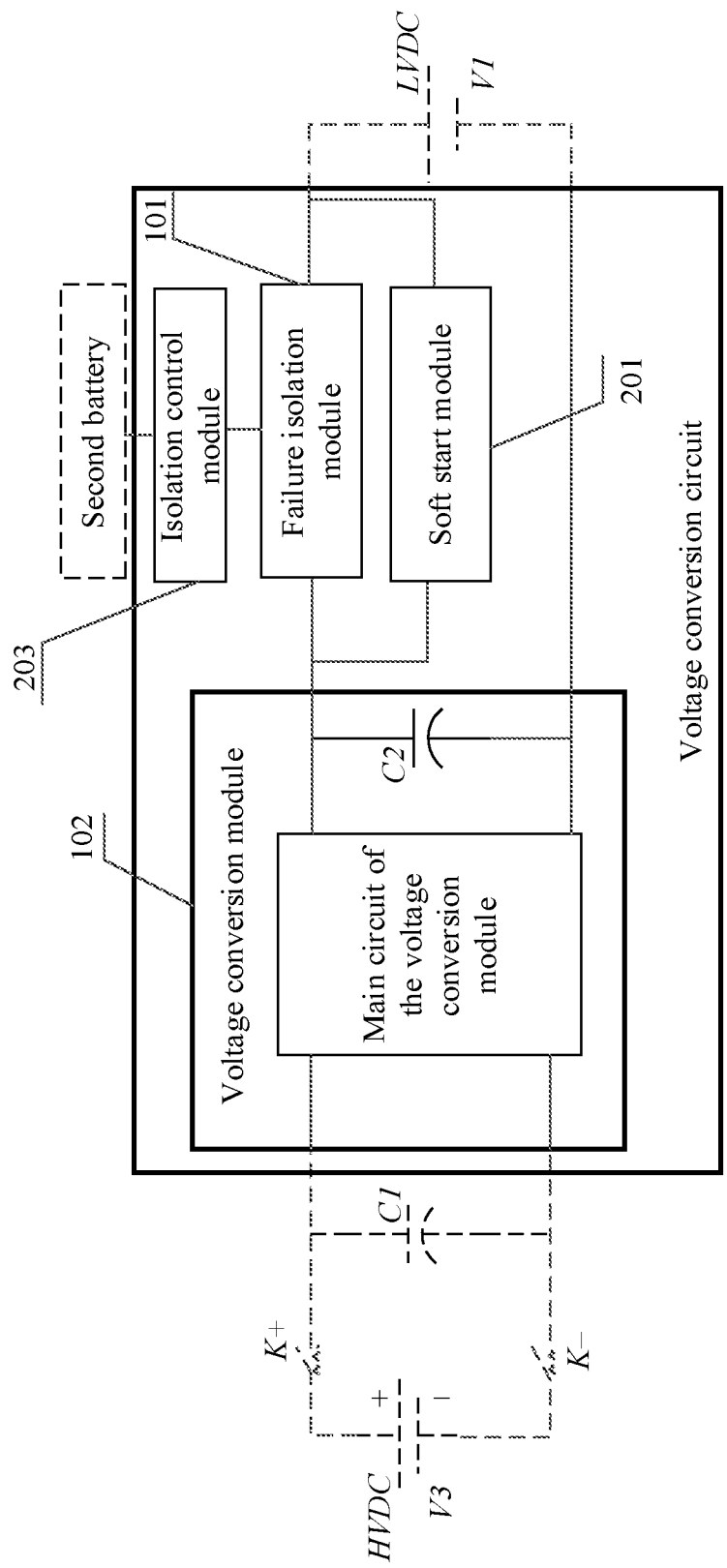
FIG. 7 is a schematic diagram 7 of a voltage conversion circuit according to an embodiment of this application.
Figure 8:
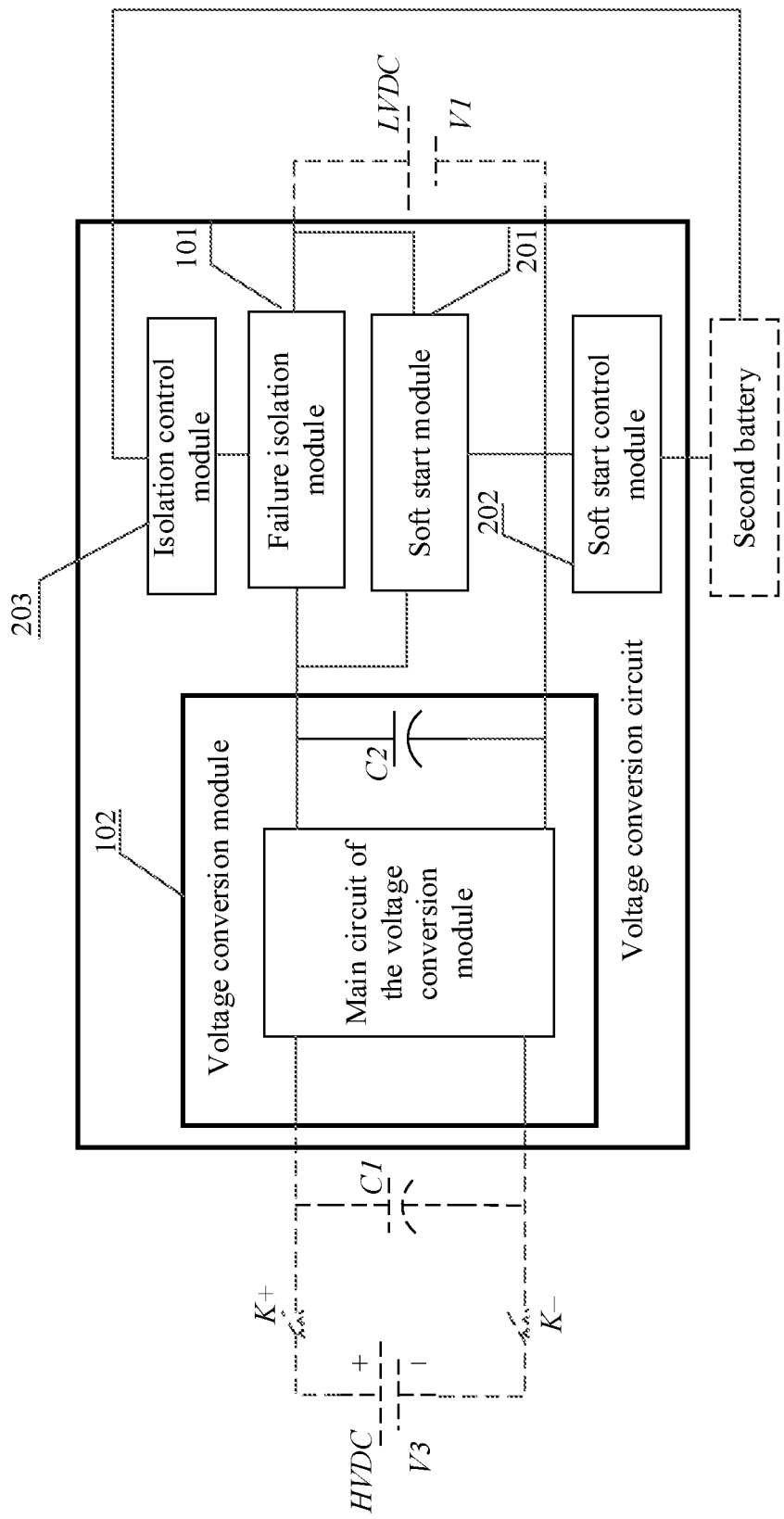
FIG. 8 is a schematic diagram 8 of a voltage conversion circuit according to an embodiment of this application.

Because a reference ground of the sixth switch in the failure isolation module is different from a control ground, a dedicated processor in the DC/DC converter needs to generate the first control signal and the second control signal for controlling the failure isolation module to be turned on or turned off. That the DC/DC converter controls the failure isolation module is complex. To make that the DC/DC converter controls the failure isolation module easy to implement, in this embodiment, a further improvement is made based on the foregoing embodiment. The voltage conversion circuit in this embodiment further includes an isolation control module 203 which may be specifically shown in FIG. 7 or FIG. 8.

The isolation control module 203 is separately connected to the third terminal of the failure isolation module 101, the first terminal of the failure isolation module 101, the second terminal of the failure isolation module 101, and the positive electrode of the second battery. One terminal of the isolation control module 203 is grounded. The isolation control module 203 is configured to: in a vehicle starting process, when the output filter capacitor C2 is charged by the first battery and the voltage at two terminals of the output filter capacitor C2 is greater than or equal to the second preset voltage, receive a first isolation module control signal to turn on the failure isolation module 101; and after charging of the high-voltage bus capacitor C1 is completed, receive a second isolation module control signal to turn on or off the failure isolation module 101.

Optionally, the isolation control module 203 includes a first control submodule and a second control submodule connected to the first control submodule. One terminal of the first control submodule is grounded. The second control submodule is separately connected to the third terminal of the failure isolation module 101, the first terminal of the failure isolation module 101, the second terminal of the failure isolation module 101, and the positive electrode of the second battery. The first control submodule is configured to receive the first isolation module control signal to control, by using the second control submodule, the failure isolation module 101 to be turned on, or the first control submodule is configured to receive the second isolation module control signal to disconnect from the second control submodule, so that the second control submodule controls the failure isolation module 101 to be turned on or turned off.

First, the first control submodule is described.

The first control submodule includes a second switch unit and a fifth resistor. A first terminal of the second switch unit is connected to the second control submodule, a second terminal of the second switch unit is connected to a first terminal of the fifth resistor, a third terminal of the second switch unit is grounded, and a second terminal of the fifth resistor is configured to receive the first isolation module control signal or the second isolation module control signal. The fifth resistor is a current limiting resistor. Optionally, the first control submodule further includes a sixth resistor. A first terminal of the sixth resistor is separately connected to the second terminal of the second switch unit and the first terminal of the fifth resistor, and a second terminal of the sixth resistor is connected to the third terminal of the second switch unit, and then, the second terminal of the sixth resistor and the third terminal of the second switch unit are grounded. The sixth resistor may prevent a misoperation of a switch in the second switch unit, and the fifth resistor is a current limiting resistor.

For the second switch unit, in a first solution, the second switch unit includes a plurality of third switches connected in series. The third switch may be a transistor. The first terminal of the second switch unit may be a collector of a $1^{st}$ third switch included in the second switch unit, the second terminal of the second switch unit may be a base of each third switch, and the third terminal of the second switch unit may be an emitter of the last third switch included in the second switch unit.

Figure 9A:
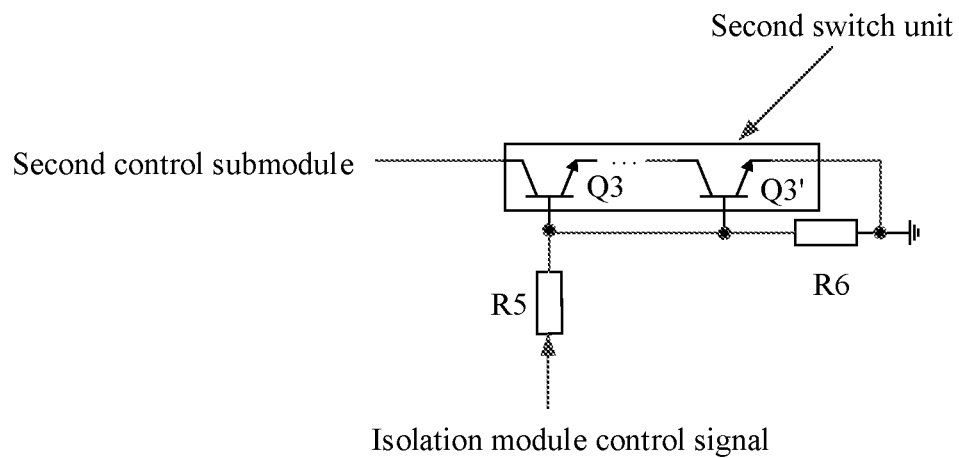
FIG. 9A is a schematic diagram 1 of a first control submodule according to an embodiment of this application.

A schematic diagram of a structure of the first control submodule corresponding to the first solution may be shown in FIG. 9A. With reference to FIG. 9A, the first control submodule includes the second switch unit, the fifth resistor R5, and the sixth resistor R6. The second switch unit includes a plurality of third switches connected in series: Q3, Q3', . . . , and the third switches are transistors. A collector of the $1^{st}$ third switch Q3 included in the second switch unit is connected to the second control submodule, a base of each third switch of the second switch unit is separately connected to the first terminal of the fifth resistor R5 and the first terminal of the sixth resistor R6, and an emitter of the last third switch Q3' of the second switch unit is grounded. The second terminal of the sixth resistor R6 is connected to the emitter of the third switch Q3', and then, the second terminal of the sixth resistor R6 and the emitter of the third switch Q3' are grounded.

In a second solution, the second switch unit is a third switch. The third switch may be a transistor, a first terminal of the third switch is a collector, a second terminal of the third switch is a base, and a third terminal of the third switch is an emitter.

Figure 9B:
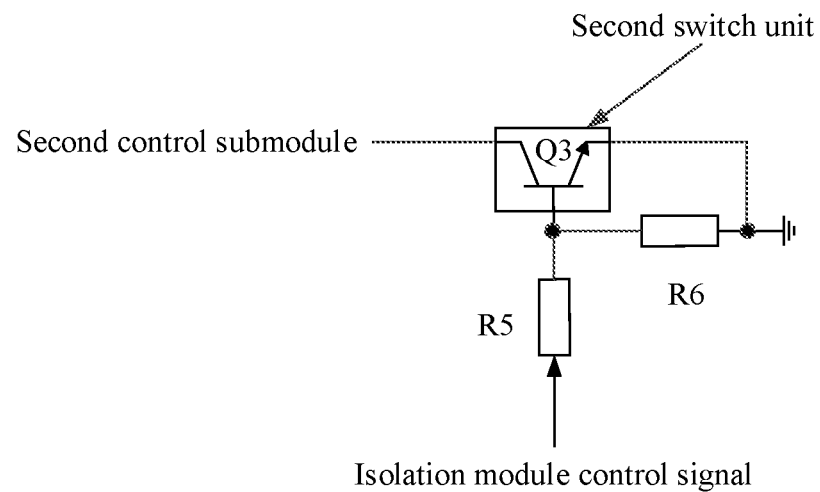
FIG. 9B is a schematic diagram 2 of a first control submodule according to an embodiment of this application.

A schematic diagram of a structure of the first control submodule corresponding to the second solution may be shown in FIG. 9B. With reference to FIG. 9B, the first control submodule includes the third switch Q3, the fifth resistor R5, and the sixth resistor R6, and the third switch Q3 is a transistor. The collector of the third switch Q3 is connected to the second control submodule, the base of the third switch Q3 is separately connected to the first terminal of the fifth resistor R5 and the first terminal of the sixth resistor R6, and the emitter of the third switch Q3 is grounded. The second terminal of the sixth resistor is connected to the emitter of the third switch Q3, and then, the second terminal of the sixth resistor and the emitter of the third switch Q3 are grounded.

Next, the second control submodule is described.

In one manner, the second control submodule includes a totem pole unit and a totem pole control unit. The totem pole unit is separately connected to the third terminal of the failure isolation module 101, the positive electrode of the second battery, the second terminal of the failure isolation module 101, and the totem pole control unit. The totem pole control unit is further separately connected to the positive electrode of the second battery, the first terminal of the failure isolation module 101, the second terminal of the failure isolation module 101, and the first control submodule. Specifically, the totem pole control unit may be connected to the first terminal of the second switch unit of the first control submodule.

For the totem pole unit, the totem pole unit includes a seventh resistor, an eighth resistor, and a totem pole. A first terminal of the totem pole is connected to the third terminal of the failure isolation module 101, a second terminal of the totem pole is connected to a first terminal of the seventh resistor, a second terminal of the seventh resistor is connected to the positive electrode of the second battery, a third terminal of the totem pole is connected to the second terminal of the failure isolation module 101, and a fourth terminal of the totem pole is connected to the totem pole control unit. A fourth terminal of the totem pole is further connected to a first terminal of the eighth resistor, and a second terminal of the eighth resistor is connected to the positive electrode of the second battery.

For the totem pole control unit, the totem pole control unit includes a ninth resistor and a diode subunit. The diode subunit is separately connected to the fourth terminal of the totem pole, the first terminal of the failure isolation module 101, the second terminal of the failure isolation module 101, a first terminal of the ninth resistor, and the first control submodule. A second terminal of the ninth resistor is connected to the positive electrode of the second battery. Specifically, the first terminal of the ninth resistor is connected to the first terminal of the second switch unit of the first control submodule.

The diode subunit includes a fourth switch and a fifth switch. A second terminal of the fourth switch is connected to the fourth terminal of the totem pole, both a first terminal of the fourth switch and a first terminal of the fifth switch are connected to the first control submodule. A third terminal of the fourth switch is connected to the second terminal of the failure isolation module 101, the first terminal of the fourth switch and the first terminal of the fifth switch are connected and then are respectively connected to the first terminal of the ninth resistor and a first control submodule. A second terminal and a third terminal of the fifth switch are short-circuited and then are connected to the first terminal of the failure isolation module 101. Specifically, the first terminal of the fourth switch and the first terminal of the fifth switch are connected and then are connected to the first terminal of the second switch unit of the first control submodule.

Optionally, the fourth switch may be an NPN transistor, and the fifth switch may be a PNP transistor. In this case, the diode subunit is an equivalent diode of a diode subunit including the fourth switch and the fifth switch. The first terminal of the fourth switch is a base, the second terminal of the fourth switch is a collector, and the third terminal of the fourth switch is an emitter. The first terminal of the fifth switch is a collector, the second terminal of the fifth switch is a base, and the third terminal of the fifth switch is an emitter.

Figure 10:
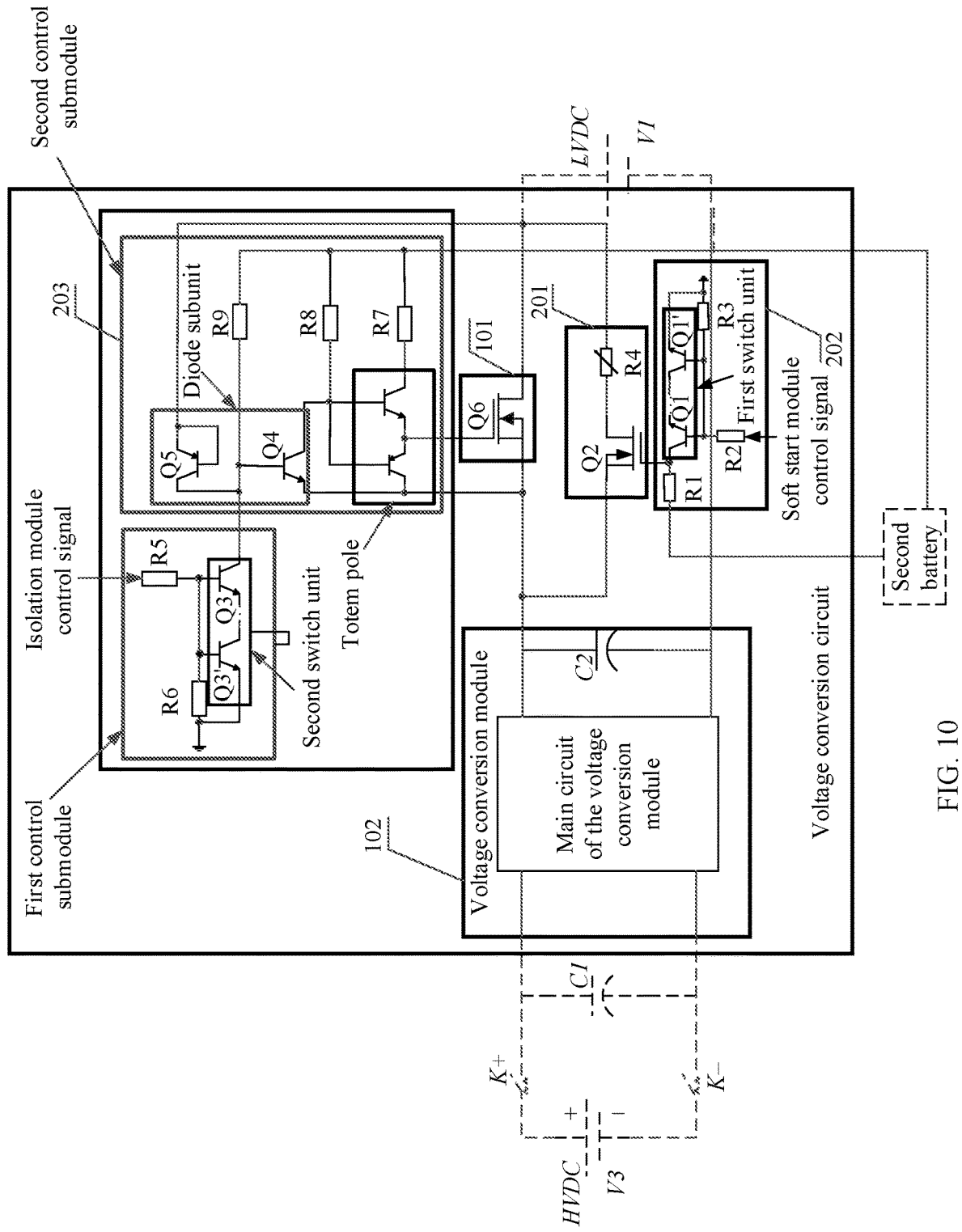
FIG. 10 is a schematic diagram 9 of a voltage conversion circuit according to an embodiment of this application.

A schematic diagram of a specific voltage conversion circuit corresponding to this embodiment may be shown by solid lines in FIG. 10. With reference to FIG. 10, the voltage conversion circuit includes the failure isolation module 101, the soft start module 201, the soft start control module 202, the isolation control module 203, and the voltage conversion module 102. The voltage conversion module 102 includes the output filter capacitor C2. The failure isolation module 101 includes the sixth switch Q6. The soft start module 201 includes the second switch Q2 and the fourth resistor R4. The soft start control module 202 includes the first switch unit, the first resistor R1, the second resistor R2, and the third resistor R3. The isolation control module 203 includes the fifth resistor R5, the sixth resistor R6, the totem pole, the seventh resistor R7, the eighth resistor R8, the ninth resistor R9, the second switch unit, the fourth switch Q4, and the fifth switch Q5. The first switch unit includes a plurality of first switches: Q1, Q1', . . . ; the second switch unit includes a plurality of third switches: Q3, Q3', . . . .

Both the drain of the sixth switch Q6 and the first terminal of the fourth resistor R4 are connected to the positive electrode of the first battery V1, both the source of the sixth switch Q6 and the source of the second switch Q2 are connected to the first terminal of the output filter capacitor C2, the drain of the second switch Q2 is connected to the second terminal of the resistor R4, and the second terminal of the output filter capacitor C2 is connected to the negative electrode of the first battery V1. The first terminal of the first resistor R1 is connected to the positive electrode of the second battery, the second terminal of the first resistor R1 is connected to the collector of the $1^{st}$ first switch Q1 included in the first switch unit, the collector of the first switch Q1 is further connected to the gate of the second switch Q2, the base of each first switch is separately connected to the first terminal of the second resistor R2 and the first terminal of the third resistor R3, and the emitter of the last first switch Q1' included in the first switch unit is grounded. The second terminal of the third resistor R3 is connected to the emitter of the first switch Q1', and then, the second terminal of the third resistor R3 and the emitter of the first switch Q1' are grounded.

The base of the fourth switch Q4 and the collector of the fifth switch Q5 are connected and then are separately connected to the collector of the $1^{st}$ third switch Q3 included in the second switch unit and the first terminal of the ninth resistor R9, and the second terminal of the ninth resistor R9 is connected to the positive electrode of the second battery. The bases of the third switches included in the second switch unit are separately connected to the first terminal of the fifth resistor R5 and the first terminal of the sixth resistor R6. The emitter of the last third switch Q3' included in the second switch unit is grounded, and the second terminal of the sixth resistor R6 is connected to the emitter of the third switch Q3', and then, the second terminal of the sixth resistor R6 and the emitter of the third switch Q3' are grounded.

The first terminal of the totem pole is connected to the gate of the sixth switch Q6, the second terminal of the totem pole is connected to the first terminal of the seventh resistor R7, and the second terminal of the seventh resistor R7 is connected to the positive electrode of the second battery. The third terminal of the totem pole is connected to the source of the sixth switch Q6, and the fourth terminal of the totem pole is connected to the collector of the fourth switch Q4. The fourth terminal of the totem pole is further connected to the first terminal of the eighth resistor R8, and the second terminal of the eighth resistor R8 is connected to the positive electrode of the second battery.

The emitter of the fourth switch Q4 is connected to the source of the sixth switch Q6, and the emitter and the base of the fifth switch Q5 are short-circuited and then are connected to the drain of the sixth switch Q6.

Still with reference to FIG. 10, when the vehicle is started, the sixth switch Q6 is turned off. The processor of the vehicle sends a high-voltage precharge instruction to the DC/DC converter. After receiving the high-voltage precharge instruction, the DC/DC converter sends the first soft start module control signal, a low-level signal, to the soft start control module to turn on the second switch Q2. A charge loop is formed between the first battery V1 and the output filter capacitor C2, and the first battery V1 starts to charge the output filter capacitor C2. For a principle in which the soft start control module receives the first soft start module control signal to turn on the second switch Q2, refer to the description of the voltage conversion circuit shown in FIG. 7.

When the DC/DC converter determines that the output filter capacitor C2 is charged by the first battery V1 and the voltage of the output filter capacitor C2 is greater than or equal to the second preset voltage, the DC/DC converter sends a first isolation module control signal to the isolation control module, where the first isolation module control signal is a high-level signal (greater than or equal to 3.3 V), where the high-level signal is input through the second terminal of the fifth resistor R5. A difference between the base voltage and the emitter voltage of each third switch included in the second switch unit is greater than 0.7 V. Each third switch is turned on, the base voltage of the fourth switch Q4 is pulled down to 0, and the fourth switch Q4 is turned off. In this case, the base voltage of the totem pole is a positive electrode voltage of the second battery, and the totem pole is turned on. The gate voltage of the sixth switch Q6 is also the positive electrode voltage of the second battery, and the source voltage of the sixth switch Q6 is a voltage of the filter capacitor C2 (the voltage of the filter capacitor C2 is the second preset voltage, the second preset voltage is less than the positive electrode voltage of the first battery, and a positive electrode voltage of the second battery is at least 6 V higher than the positive electrode voltage of the first battery). In this case, a difference between the gate voltage and the source voltage of the sixth switch Q6 is greater than 5 V, and the sixth switch Q6 is turned on. In this case, the voltage conversion module 102 may convert the low-voltage current output by the first battery V1 into the high-voltage current, to charge the high-voltage bus capacitor C1.

Optionally, when the DC/DC converter determines that the output filter capacitor C2 is charged by the first battery V1 and the voltage of the output filter capacitor C2 is greater than or equal to the second preset voltage, the DC/DC converter may further send the second soft start module control signal, a high-level signal, to the soft start control module, to turn off the second switch Q2, that is, the soft start module 201 is turned off. For a principle in which the soft start control module receives the second soft start module control signal to turn off the second switch Q2, refer to the description of the voltage conversion circuit shown in FIG. 7.

After charging of the high-voltage bus capacitor C1 is completed, because the voltage of the output filter capacitor C2 decreases gradually, to prevent the voltage of the first battery V1 from being pulled down and the sixth switch Q6 from being damaged, the DC/DC converter sends the second isolation module control signal to the isolation control module, where the second isolation module control signal is a low-level signal. The low-level signal is input to the second terminal of the fifth resistor R5, so that a difference between the base voltage and the emitter voltage of each third switch of the second switch unit is less than 0.7 V, and each third switch is turned off. This is equivalent to that the isolation control module does not have the second switch unit and the first control submodule that includes the fifth resistor R5 and the sixth resistor R6, and only has the second control submodule. In this case, the base voltage of the fourth switch Q4 is obtained by subtracting a transistor voltage drop of the fifth switch Q5 from the positive electrode voltage of the first battery, and the emitter voltage of the fourth switch Q4 is the voltage of the output filter capacitor C2. When the voltage of the output filter capacitor C2 decreases and a difference between the base voltage of the fourth switch Q4 and the emitter voltage of the fourth switch Q4 is greater than 0.7 V, the fourth switch Q4 is turned on. In this case, the base voltage of the totem pole is pulled down to the voltage of the output filter capacitor C2, and the totem pole is turned off. The sixth switch Q6 cannot be driven to be turned on, the sixth switch Q6 is turned off, and the failure isolation module 101 is turned off.

After the charging of the high-voltage bus capacitor C1 is completed, the DC/DC converter further sends information indicating completion of high-voltage precharging to the processor of the vehicle. Optionally, after receiving the information indicating the completion of high-voltage precharging, the processor of the vehicle may control the first relay and the second relay to be turned on, and send an instruction of converting the high-voltage direct current to the low-voltage direct current to the DC/DC converter. After receiving the instruction of converting the high-voltage direct current to the low-voltage direct current, the DC/DC converter continuously inputs the second isolation module control signal, a low-level signal, to the isolation control module 203, so that each third switch in the second switch unit is turned off, and the second control submodule independently controls the sixth switch Q6 to be turned on or off.

A specific process in which the second control submodule independently controls the sixth switch Q6 to be turned on or off may be as follows:

After the first relay and the second relay are turned on, the voltage of the output filter capacitor C2 gradually increases. The base voltage of the fourth switch Q4 is the voltage of the first battery plus the transistor voltage drop of the fifth switch Q5, and the emitter voltage of the fourth switch Q4 is the voltage of the output filter capacitor C2. When the voltage of the output filter capacitor C2 increases, and the base voltage of the fourth switch Q4 is not 0.7 V greater than the emitter voltage, the fourth switch Q4 is turned off. In this case, the base voltage of the totem pole is the positive electrode voltage of the second battery, the totem pole is turned on, and the gate voltage of the sixth switch Q6 is also the positive electrode voltage of the second battery. The source voltage of the sixth switch Q6 is the voltage of the output filter capacitor C2, and the voltage of the output filter capacitor C2 is slightly greater than the positive electrode voltage of the first battery. In this case, a difference between the gate voltage and the source voltage of the sixth switch Q6 is greater than 5 V, and the sixth switch Q6 is turned on, so that the voltage conversion module 102 in the voltage conversion circuit converts a high-voltage direct current into a low-voltage direct current to supply power for low-voltage components on the vehicle, and the vehicle starts to run normally.

If the voltage conversion module 102 of the DC/DC converter fails, the voltage of the output filter capacitor C2 gradually decreases. In this case, the base voltage of the fourth switch Q4 is the positive electrode voltage of the first battery plus the transistor voltage drop of the fifth switch Q5, and the emitter voltage of the fourth switch Q4 is the voltage of the output filter capacitor C2. When the voltage of the output filter capacitor C2 decreases and a difference between the base voltage of the fourth switch Q4 and the emitter voltage of the fourth switch Q4 is greater than 0.7 V, the fourth switch Q4 is turned on. In this case, the base voltage of the totem pole is pulled down to the voltage of the output filter capacitor C2, and the totem pole is turned off. The sixth switch Q6 cannot be driven to be turned on, the sixth switch Q6 is turned off, and the failure isolation module 101 is turned off, thereby preventing the voltage of the first battery V1 from being pulled down and the failure isolation module 101 from being burnt.

Figure 11:
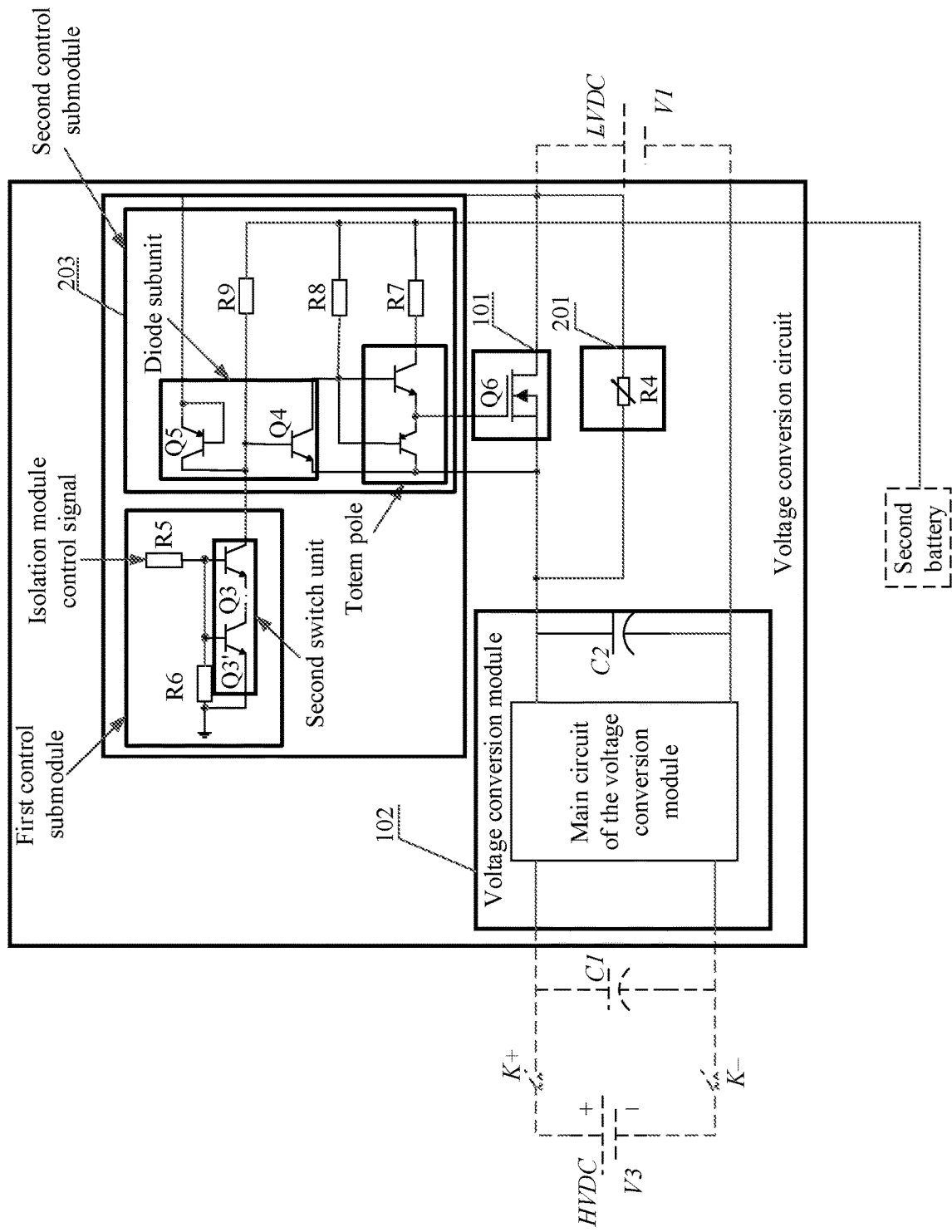
FIG. 11 is a schematic diagram 10 of a voltage conversion circuit according to an embodiment of this application.

A schematic diagram of another specific voltage conversion circuit corresponding to this embodiment may be shown by solid lines in FIG. 11. With reference to FIG. 11, the voltage conversion circuit includes the failure isolation module 101, the soft start module 201, the isolation control module 203, and the voltage conversion module 102. The voltage conversion module 102 includes the output filter capacitor C2. The failure isolation module 101 includes the sixth switch Q6, and the soft start module 201 includes the fourth resistor R4. The isolation control module 203 includes the fifth resistor R5, the sixth resistor R6, the totem pole, the seventh resistor R7, the eighth resistor R8, the ninth resistor R9, the second switch unit, the fourth switch Q4, and the fifth switch Q5. The second switch unit includes a plurality of third switches: Q3, Q3', . . . .

Both the drain of the sixth switch Q6 and the first terminal of the fourth resistor R4 are connected to the positive electrode of the first battery V1, both the source of the sixth switch Q6 and the second terminal of the fourth resistor R4 are connected to the first terminal of the output filter capacitor C2, and the second terminal of the output filter capacitor C2 is connected to the negative electrode of the first battery V1.

The base of the fourth switch Q4 and the collector of the fifth switch Q5 are connected and then are separately connected to the collector of the 1$^{st}$ third switch Q3 included in the second switch unit and the first terminal of the ninth resistor R9, and the second terminal of the ninth resistor R9 is connected to the positive electrode of the second battery. The bases of the third switches included in the second switch unit are separately connected to the first terminal of the fifth resistor R5 and the first terminal of the sixth resistor R6. The emitter of the last third switch Q3' included in the second switch unit is grounded, and the second terminal of the sixth resistor R6 is connected to the emitter of the third switch Q3', and then, the second terminal of the sixth resistor R6 and the emitter of the third switch Q3' are grounded. The first terminal of the totem pole is connected to the gate of the sixth switch Q6, the second terminal of the totem pole is connected to the first terminal of the seventh resistor R7, and the second terminal of the seventh resistor R7 is connected to the positive electrode of the second battery. The third terminal of the totem pole is connected to the source of the sixth switch Q6, and the fourth terminal of the totem pole is connected to the collector of the fourth switch Q4. The fourth terminal of the totem pole is further connected to the first terminal of the eighth resistor R8, and the second terminal of the eighth resistor R8 is connected to the positive electrode of the second battery. The emitter of the fourth switch Q4 is connected to the source of the sixth switch Q6, and the emitter and the base of the fifth switch Q5 are short-circuited and then are connected to the drain of the sixth switch Q6.

Still with reference to FIG. 11, when the vehicle is started, the sixth switch Q6 is turned off. The processor of the vehicle sends a high-voltage precharge instruction to the DC/DC converter. After receiving the high-voltage precharge instruction, the DC/DC converter determines whether the output filter capacitor C2 is charged by the first battery and the voltage of the output filter capacitor C2 is greater than or equal to the second preset voltage. If yes, the DC/DC converter sends the first isolation module control signal, a high-level signal, to the isolation control module, to turn on the sixth switch Q6; or if no, when the DC/DC converter determines that the voltage of the output filter capacitor C2 is greater than or equal to the second preset voltage, the DC/DC converter sends the first isolation module control signal, a high-level signal, to the isolation control module to turn on the sixth switch Q6. When the sixth switch Q6 is turned on, the voltage conversion module 102 may convert the low-voltage current output by the first battery V1 into the high-voltage current, to charge the high-voltage bus capacitor C1. After the charging of the high-voltage bus capacitor C1 is completed, because the voltage of the output filter capacitor C2 decreases gradually, to prevent the voltage of the first battery V1 from being pulled down and the sixth switch Q6 from being damaged, the DC/DC converter sends the second isolation module control signal, a low-level signal, to the isolation control module to turn off the sixth switch Q6, and the failure isolation module 101 is turned off.

After the charging of the high-voltage bus capacitor C1 is completed, the DC/DC converter further sends information indicating completion of high-voltage precharging to the processor of the vehicle. Optionally, after receiving the information indicating the completion of high-voltage precharging, the processor of the vehicle may control the first relay and the second relay to be turned on, and send an instruction of converting the high-voltage direct current to the low-voltage direct current to the DC/DC converter. After receiving the instruction of converting the high-voltage direct current to the low-voltage direct current, the DC/DC converter continuously inputs the second isolation module control signal, a low-level signal, to the isolation control module 203, so that each third switch Q3 included in the second switch unit is turned off, and the second control submodule independently controls the sixth switch Q6 to be turned on or off. For a specific process in which the second control submodule independently controls the sixth switch Q6 to be turned on or off, refer to the description of the voltage conversion circuit in FIG. 10. Details are not described herein again.

In this embodiment, because the isolation control module is grounded and a reference ground in the isolation control module is the same as a power ground, the DC/DC converter does not need a dedicated processor to generate a control signal for controlling the isolation module to be turned on or off. That is, in this embodiment, on the basis of improving the reliability of the power supply circuit of the vehicle, the DC/DC converter may easily implement control on the isolation control module.

In addition, if costs of the DC/DC converter in this embodiment of this application are less than costs of a precharge circuit relative to a module added to a current DC/DC converter, the voltage conversion circuit in this embodiment of this application may further reduce costs of the power supply circuit of the vehicle.

An embodiment of this application further provides a DC/DC converter. The DC/DC converter in this embodiment may include the voltage conversion circuit in any one of foregoing embodiments.

Because a soft start module is disposed in the voltage conversion circuit, the DC/DC converter in this embodiment has a failure isolation module. When a vehicle is started, a low-voltage direct current output by a low-voltage battery may be converted into a high-voltage direct current to charge a high-voltage bus capacitor, so that a precharge circuit in a power supply circuit of the vehicle may be omitted, and reliability of the power supply circuit of the vehicle is improved.

Figure 12:
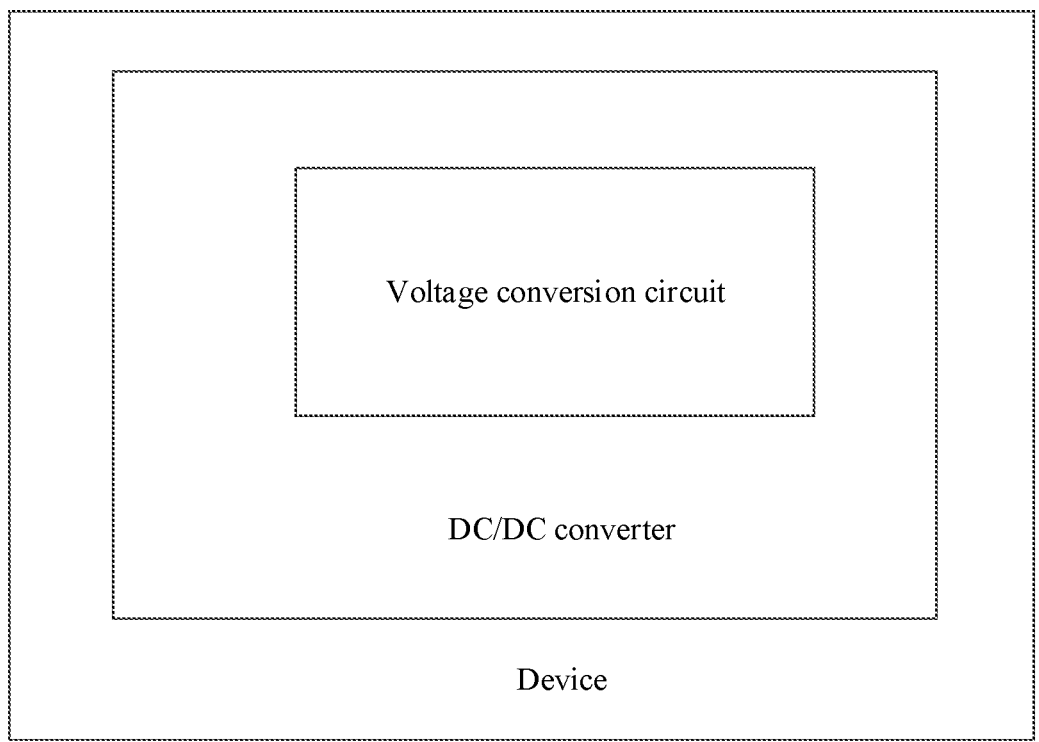
FIG. 12 is a schematic diagram of a vehicle according to an embodiment of this application.

FIG. 12 is a schematic diagram of a structure of a vehicle according to an embodiment of this application. With reference to FIG. 12, the vehicle in this embodiment includes the bidirectional DC/DC converter described in the foregoing embodiment.

Because a soft start module is disposed in a voltage conversion circuit, the DC/DC converter included in the vehicle in this embodiment has a failure isolation module. When a vehicle is started, a low-voltage direct current output by a low-voltage battery may be converted into a high-voltage direct current to charge a high-voltage bus capacitor, so that a precharge circuit in a power supply circuit of the vehicle may be omitted, and reliability of the power supply circuit of the vehicle is improved.

It may be understood that various numbers (for example, the first switch and the second switch) in the present invention are merely distinctions for convenience of description, and are not intended to limit the scope of embodiments of the present invention.

What is claimed is:

1. A voltage conversion circuit, comprising: a failure isolation module, a soft start module, and a voltage conversion module, wherein the voltage conversion module comprises an output filter capacitor;
   both a first terminal of the failure isolation module and a first terminal of the soft start module are connected to a positive electrode of a first battery, both a second terminal of the failure isolation module and a second terminal of the soft start module are connected to a first terminal of the output filter capacitor, a second terminal of the output filter capacitor is connected to a negative electrode of the first battery, the voltage conversion module is connected to a high-voltage bus capacitor, and a rated voltage of the first battery is less than or equal to a first preset voltage;
   the soft start module is configured to connect the first battery and the output filter capacitor, so that the first battery charges the output filter capacitor; and
   the failure isolation module is configured to be turned on when the output filter capacitor is charged by the first battery and a voltage of the output filter capacitor is greater than or equal to a second preset voltage, so that the voltage conversion module converts a low-voltage direct current output by the first battery into a high-voltage direct current to charge the high-voltage bus capacitor, wherein the second preset voltage is less than the first preset voltage.

2. The voltage conversion circuit according to claim 1, further comprising a soft start control module, wherein the soft start control module is separately connected to a third terminal of the soft start module and a positive electrode of a second battery, and one terminal of the soft start control module is grounded; and
   the soft start control module is configured to, when a device is started, receive a first soft start module control signal to control the soft start module to be turned on, so that the first battery is connected to the output filter capacitor, wherein the device is a device in which the voltage conversion circuit is located.

3. The voltage conversion circuit according to claim 2, wherein the soft start control module comprises a first switch unit, a first resistor, and a second resistor;
   a first terminal of the first switch unit is separately connected to the third terminal of the soft start module and a first terminal of the first resistor, a second terminal of the first switch unit is connected to a first terminal of the second resistor, and a third terminal of the first switch unit is grounded; and
   a second terminal of the first resistor is connected to the positive electrode of the second battery, and a second terminal of the second resistor is configured to receive the first soft start module control signal.

4. The voltage conversion circuit according to claim 3, wherein the first switch unit comprises a first switch.

5. The voltage conversion circuit according to claim 4, wherein the first switch is a transistor, a first terminal of the first switch is a collector, a second terminal of the first switch is a base, and a third terminal of the first switch is an emitter.

6. The voltage conversion circuit according to claim 3, wherein the first switch unit comprises a plurality of first switches connected in series.

7. The voltage conversion circuit according to claim 6, wherein the first switch is a transistor, the first terminal of the first switch unit is a collector of an initial first switch comprised in the first switch unit, the second terminal of the first switch unit is a base of each first switch, and the third terminal of the first switch unit is an emitter of the last first switch comprised in the first switch unit.

8. The voltage conversion circuit according to claim 3, wherein the soft start control module further comprises a third resistor, a first terminal of the third resistor is separately connected to the first terminal of the second resistor and the second terminal of the first switch unit, and a second terminal of the third resistor is grounded.

9. The voltage conversion circuit according to claim 2, wherein the soft start module comprises a second switch and a fourth resistor; and
   a first terminal of the fourth resistor is connected to the positive electrode of the first battery, a second terminal of the fourth resistor is connected to a first terminal of the second switch, a second terminal of the second switch is connected to the first terminal of the output filter capacitor, and a third terminal of the second switch is connected to the soft start control module.

10. The voltage conversion circuit according to claim 1, wherein the soft start module comprises a fourth resistor; and a first terminal of the fourth resistor is connected to the positive electrode of the first battery, and a second terminal of the fourth resistor is connected to the first terminal of the output filter capacitor.

11. The voltage conversion circuit according to claim 1, further comprising an isolation control module, wherein the isolation control module is separately connected to a third terminal of the failure isolation module, the first terminal of the failure isolation module, the second terminal of the failure isolation module, and the positive electrode of the second battery, and one terminal of the isolation control module is grounded; and the isolation control module is configured to, when the output filter capacitor is charged by the first battery and the voltage of the output filter capacitor is greater than or equal to the second preset voltage, receive a first isolation module control signal to turn on the failure isolation module.

12. The voltage conversion circuit according to claim 11, wherein the isolation control module comprises a first control submodule and a second control submodule connected to the first control submodule; one terminal of the first control submodule is grounded, and the second control submodule is separately connected to the third terminal of the failure isolation module, the first terminal of the failure isolation module, the second terminal of the failure isolation module, and the positive electrode of the second battery; and the first control submodule is configured to receive the first isolation module control signal, to control, by using the second control submodule, the failure isolation module to be turned on.

13. The voltage conversion circuit according to claim 12, wherein the first control submodule comprises a second switch unit and a fifth resistor; and a first terminal of the second switch unit is connected to the second control submodule, a second terminal of the second switch unit is connected to a first terminal of the fifth resistor, a third terminal of the second switch unit is grounded, and a second terminal of the fifth resistor is configured to receive the first isolation module control signal.

14. The voltage conversion circuit according to claim 13, wherein the second switch unit comprises a third switch.

15. A DC/DC converter, comprising the voltage conversion circuit according to claim 1.

* * * * *